(12) United States Patent
Ootake et al.

(10) Patent No.: US 7,423,107 B2
(45) Date of Patent: Sep. 9, 2008

(54) POLYMER OBTAINED WITH SILSESQUIOXANE DERIVATIVE

(75) Inventors: Nobumasa Ootake, Chiba (JP); Masami Tanaka, Chiba (JP)

(73) Assignees: Chisso Petrochemical Corporation, Tokyo (JP); Chisso Corporation, Osaka (JP)

( * ) Notice: Subject to any disclaimer, the term of this patent is extended or adjusted under 35 U.S.C. 154(b) by 188 days.

(21) Appl. No.: 10/548,378

(22) PCT Filed: Mar. 3, 2004

(86) PCT No.: PCT/JP2004/002663

§ 371 (c)(1),
(2), (4) Date: Oct. 19, 2005

(87) PCT Pub. No.: WO2004/081085

PCT Pub. Date: Sep. 23, 2004

(65) Prior Publication Data

US 2006/0100410 A1 May 11, 2006

(30) Foreign Application Priority Data

Mar. 11, 2003 (JP) ............................. 2003-065435

(51) Int. Cl.
*C08G 77/48* (2006.01)
(52) U.S. Cl. ............................. 528/31; 528/25; 528/32; 528/35; 525/478
(58) Field of Classification Search ........................ None
See application file for complete search history.

(56) References Cited

U.S. PATENT DOCUMENTS

| 5,412,053 | A | 5/1995 | Lichtenhan et al. |
| 5,484,867 | A | 1/1996 | Lichtenhan et al. |
| 5,589,562 | A | 12/1996 | Lichtenhan et al. |
| 6,252,030 | B1 | 6/2001 | Zank et al. |
| 7,169,873 | B2 * | 1/2007 | Morimoto et al. ............. 528/37 |

FOREIGN PATENT DOCUMENTS

| JP | 02-67290 | 3/1990 |
| JP | 6-329687 | 11/1994 |
| JP | 2000-265065 | 9/2000 |
| JP | 2000-265066 | 9/2000 |
| JP | 2000-334881 | 12/2000 |
| JP | 2002-69191 | 3/2002 |
| JP | 2002-284878 | 10/2002 |
| JP | 2002-363285 | 12/2002 |
| JP | 2004-4612 | 1/2004 |
| WO | 03/024870 | 3/2003 |
| WO | 2004/024741 | 3/2004 |

OTHER PUBLICATIONS

Joseph D. Lichtenhan et al., "Silsesquioxane-Siloxane Copolymers from Polyhedral Silsesquioxanes" Macromolecules, 26, pp. 2141-2142, 1993.
Toshiaki Kobayashi et al., "Synthesis of Highly Heat-Resistant Soluble Polymers through Hydrosilylation Polymerization between Octakis(hydridosilsesquioxane) and Diynes", Chemistry Letters, pp. 763-764, 1998.
Chunxin Zhang et al., "Highly Porous Polyhedral Silsesquioxane Polymers. Synthesis and Characterization", J. Am. Chem. Soc., 120, pp. 8380-8391, 1998.
Polymer Preprints, Japan, vol. 50, No. 12, 2001.
Joseph D. Lichtenhan et al., "Polyhedral Oligomeric Silsesquioxanes: Building Blocks for Silsesquioxane-Based Polymers and Hybrid Materials", Comments Inorg. Chem., vol. 17, pp. 115-130, 1995.

* cited by examiner

*Primary Examiner*—Marc S Zimmer
(74) *Attorney, Agent, or Firm*—Wenderoth, Lind & Ponack, L.L.P.

(57) ABSTRACT

The present invention is a polymer obtained by using a silsesquioxane derivative represented by formula (1-0). In the formula $R^0$ each independently represents hydrogen, alkyl, aryl or arylalkyl, and Y each represents a group represented by formula (a) or formula (b). In each of formula (a) and formula (b), at least one of X represents hydrogen, chlorine or a group having one of —CH=CH—, —C≡C—, —OH, —COOH, —COO—, 2-oxapropane-1,3-dioyl, oxiranyl, oxiranylene, oxetanyl, oxetanylene, 3,4-epoxycyclohexyl, —SH, —NH— and —$NH_2$, and in formula (b), Z represents —O—, —$CH_2$— or a single bond.

19 Claims, No Drawings

POLYMER OBTAINED WITH SILSESQUIOXANE DERIVATIVE

TECHNICAL FIELD

The present invention relates to a polymer obtained by using a silsesquioxane derivative. The polymer is used as an electronic material, an optical material, an electrooptical material, a coating composition, a primer and the like.

BACKGROUND ART

A polymer having a silsesquioxane skeleton has been investigated for various applications owing to the peculiar structure thereof. A polymer having a silsesquioxane skeleton has been synthesized by the sol-gel process using an alkoxysilane, such as tetraethoxysilane. However, the sol-gel process has some remaining problems in that it requires prolonged reaction time, and a resulting polymer tends to have fine pores remaining therein.

A polymer using a silsesquioxane having a cage structure or a derivative thereof has been investigated. The polymer is expected to be excellent in weather resistance, heat resistance, physical properties, optical properties and the like. For example, Patent Documents 1 and 2 disclose a production process of a copolymer obtained by bonding a so-called incomplete cage structures, which has a defect in the cage structure of silsesquioxane (i.e., a structure not having a complete octahedral shape but having a defect in the octahedral shape), through siloxane. The production process uses such a method that a polyhedral oligomeric silsesquioxane is crosslinked through a bifunctional silane having an amine or the like as a functional group, siloxane or an organic metal compound. Non-patent Document 1 discloses a production process of a copolymer having a main chain obtained by bonding a silsesquioxane having an incomplete cage structure through siloxane or the like, and a production process of a copolymer having a silsesquioxane having a cage structure as a pendant copolymer component and methacrylic acid as a main chain component. Furthermore, Non-patent Document 2 discloses a production process of a silsesquioxane-siloxane copolymer obtained by reacting OH bonded to Si positioned at a corner of an incomplete cage structure of silsesquioxane with bis(dimethylamino)silane or the like.

Patent Document 3 discloses, on the other hand, a production process of a copolymer by reacting a silsesquioxane having a complete cage structure with a compound having a vinyl group. Non-patent Document 3 reports that hydrogenated octasilsesquioxane and phenylethynylbenzene are subjected to hydrosilylation polymerization to obtain a copolymer. Non-patent Document 4 reports that a silsesquioxane compound having a complete cage structure with vinyl groups bonded to plural corners of the cage structure and a hydrogenated silsesquioxane compound having a complete cage structure are subjected to hydrosilylation polymerization to obtain a gelled copolymer. Patent Documents 4 and 5 disclose a production process for obtaining a copolymer having an organic solvent soluble hydrogenated octasilsesquioxane by a reaction of a hydrogenated octasilsesquioxane having a cage structure with a hydroxyl group-containing compound or a vinyl group-containing compound. All of these have such a structure that a silsesquioxane having a complete cage structure is grafted to a main chain or forms a crosslinked point. In the case where a silsesquioxane having a cage structure is grafted to a polymer chain, the silsesquioxane exhibits a modification effect to the polymer by inhibiting the local molecular motion, but does not contribute to change in polymer chain structure. In the case where a silsesquioxane forms a crosslinked point, on the other hand, a gelled copolymer is formed, which is inferior in moldability.

Patent Document 1: U.S. Pat. No. 5,412,053
Patent Document 2: U.S. Pat. No. 5,589,562
Patent Document 3: U.S. Pat. No. 5,484,867
Patent Document 4: JP-A-2002-069191
Patent Document 5: JP-A-2000-265065
Non-patent Document 1: Comments Inorg. Chem., vol. 17, pp. 115-130 (1995)
Non-patent Document 2: Macromolecules, vol. 26, pp. 2141-2142 (1993)
Non-patent Document 3: Chem. Lett., 1998, pp. 763-764
Non-patent Document 4: J. Am. Chem. Soc., vol. 120, pp. 8380-8391 (1998)
Non-patent Document 5: Polymer Preprints, Japan, vol. 50, No. 12 (2001)

In electric and electronic materials, particularly, insulating property, heat resistance, durability, moldability and the like thereof are demanded to be further improved. However, the conventional silsesquioxane polymers fail to satisfy the properties. Accordingly, such a copolymer has been demanded that has a silsesquioxane having a cage structure excellent in heat resistance, weather resistance, electric insulating property, hardness, mechanical strength, chemical resistance and the like as a main chain, is clearly defined in position of bond, and is excellent in moldability. However, a copolymer having a silsesquioxane having a cage structure as a main chain is difficult to produce by using conventional compounds. Non-patent Document 5 discloses compounds capable of being used as a raw material of the main chain type polymer, but there is only one disclosed example for a copolymer having a silsesquioxane skeleton of a T8 structure introduced into a main chain, and specific characteristics thereof are not sufficiently clarified. Furthermore, the copolymer still has room for improvement, e.g., it has a glass transition temperature of 125° C. By introducing a silsesquioxane skeleton having a T8D2 structure or a structure similar thereto into a main chain, the molecular weight or the like can be arbitrarily controlled to adjust the physical properties to intended values. Assuming that a structure where three oxygens are bonded to Si is referred to as a T structure, and a structure where two oxygens are bonded to Si is referred to as a D structure, the T8D2 structure means such a structure that is formed by combining eight T structures and two D structures.

DISCLOSURE OF THE INVENTION

The inventors have found that by using a silsesquioxane derivative represented by formula (1-0), such a polymer is obtained that has a skeleton of the silsesquioxane derivative as a main chain. They also have found that a colorless transparent coating film obtained from the polymer is excellent in adhesion property, flexibility, mechanical strength, heat resistance and the like, and has a function of preventing metallic ions from being eluted. A preferred example of a process for obtaining the polymer is a process utilizing a hydrosilylation reaction. Preferred processes for obtaining the polymer utilizing a hydrosilylation reaction are the following two processes. The first example is a process of reacting a compound (1-0) having at least two alkenyls with a compound having at least two Si—H groups in the presence of a hydrosilylation catalyst. The second example is a process of reacting a compound (1-0) having at least two Si—H groups with a compound having at least two alkenyls or a compound having a carbon-carbon triple bond in the presence of a hydrosilylation catalyst.

The terms used in the invention are defined as follows. Both alkyl and alkylene each may be either a linear group or a branched group. This is also applied to the case where arbitrary hydrogen of the groups is replaced by halogen or a cyclic group, and the case where arbitrary —CH$_2$— is replaced by —O—, —CH=CH—, cycloalkylene, cycloalkenylene, phenylene or the like. The term "arbitrary" used in the invention means that not only the position but also the number are arbitrary. In the case where plural groups are replaced by other groups, the groups may be replaced by different groups, respectively. For example, in the case where —CH$_2$— in alkyl may be replaced by —O— or —CH=CH—, the alkyl may be alkoxyalkenyl or alkenyloxyalkyl. The groups of alkoxy, alkenylene, alkenyl and alkylene in these groups each may be either a linear group or a branched group. However, in the case where it is described in the invention that arbitrary —CH$_2$— may be replaced by —O—, such a case is not included that plural —CH$_2$— adjacent to each other are replaced by —O—. Examples of the halogen in the invention include fluorine, chlorine and bromine. The term "alkenyl" is defined as a generic term of alkenyl and groups having alkenyl. However, these definitions are not applied in the case where they are used as a part of a compound name.

The aforementioned problems are solved by the following items.

[1] A polymer obtained by using a silsesquioxane derivative represented by formula (1-0):

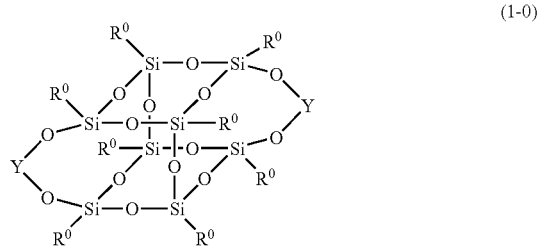

(1-0)

wherein R$^0$ each independently represents hydrogen, alkyl, aryl or arylalkyl; in the alkyl, the number of carbon atoms is from 1 to 40, arbitrary hydrogen may be replaced by fluorine, and arbitrary —CH$_2$— may be replaced by —O—, —CH=CH—, cycloalkylene or cycloalkenylene; in the aryl, arbitrary hydrogen may be replaced by halogen or alkyl having a carbon number of from 1 to 20; the arylalkyl is constituted by aryl, arbitrary hydrogen of which may be replaced by halogen or alkyl having a carbon number of from 1 to 20, and alkylene, arbitrary hydrogen of which may be replaced by fluorine, and arbitrary —CH$_2$— of which may be replaced by —O—, —CH=CH— or cycloalkylene; in the alkyl having a carbon number of from 1 to 20 as a substituent of the aryl, arbitrary hydrogen may be replaced by fluorine, and arbitrary —CH$_2$— may be replaced by —O—, —CH=CH—, cycloalkylene or phenylene; and Y each represents a group represented by formula (a) or formula (b):

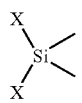

(a)

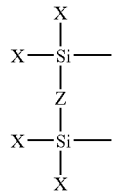

(b)

wherein X each independently represents hydrogen, chlorine, a group defined as similar to R$^0$, or a group having one of —CH=CH—, —C≡C—, —OH, —COOH, —COO—, 2-oxapropane-1,3-dioyl, oxiranyl, oxiranylene, oxetanyl, oxetanylene, 3,4-epoxycyclohexyl, —SH, —NH—, —NH$_2$, —CN and —O—; in each of formula (a) and formula (b), at least one of X represents hydrogen, chlorine or a group having one of —CH=CH—, —C≡C—, —OH, —COOH, —COO—, 2-oxapropane-1,3-dioyl, oxiranyl, oxiranylene, oxetanyl, oxetanylene, 3,4-epoxycyclohexyl, —SH, —NH— and —NH$_2$; and in formula (b), Z represents a single bond, —O— or —CH$_2$—.

[2] The polymer as described in the item [1], which is obtained by using a silsesquioxane derivative represented by formula (1-0) and a compound having at least two groups capable of reacting with a reactive group in the silsesquioxane derivative:

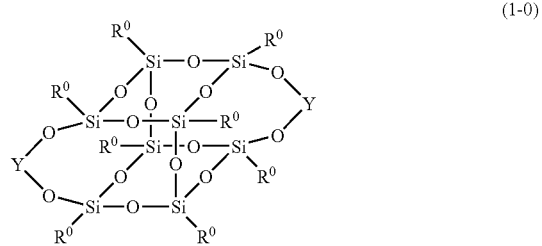

(1-0)

wherein R$^0$ each independently represents hydrogen, alkyl, aryl or arylalkyl; in the alkyl, the number of carbon atoms is from 1 to 40, arbitrary hydrogen may be replaced by fluorine, and arbitrary —CH$_2$— may be replaced by —O—, —CH=CH—, cycloalkylene or cycloalkenylene; in the aryl, arbitrary hydrogen may be replaced by halogen or alkyl having a carbon number of from 1 to 20; the arylalkyl is constituted by aryl, arbitrary hydrogen of which may be replaced by halogen or alkyl having a carbon number of from 1 to 20, and alkylene, arbitrary hydrogen of which may be replaced by fluorine, and arbitrary —CH$_2$— of which may be replaced by —O—, —CH=CH— or cycloalkylene; in the alkyl having a carbon number of from 1 to 20 as a substituent of the aryl, arbitrary hydrogen may be replaced by fluorine, and arbitrary —CH$_2$— may be replaced by —O—, —CH=CH—, cycloalkylene or phenylene; and Y each represents a group represented by formula (a) or formula (b):

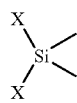

(a)

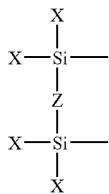

wherein X each independently represents hydrogen, chlorine, a group defined as similar to $R^0$, or a group having one of —CH=CH—, —C≡C—, —OH, —COOH, —COO—, 2-oxapropane-1,3-dioyl, oxiranyl, oxiranylene, oxetanyl, oxetanylene, 3,4-epoxycyclohexyl, —SH, —NH—, —NH$_2$, —CN and —O—; in each of formula (a) and formula (b), at least one of X represents hydrogen, chlorine or a group having one of —CH=CH—, —C≡C—, —OH, —COOH, —COO—, 2-oxapropane-1,3-dioyl, oxiranyl, oxiranylene, oxetanyl, oxetanylene, 3,4-epoxycyclohexyl, —SH, —NH— and —NH$_2$; and in formula (b), Z represents a single bond, —O— or —CH$_2$—.

[3] The polymer as described in the item [2], wherein $R^0$ each independently represents alkyl having a carbon number of from 1 to 8, naphthyl, phenyl or phenylalkyl; in the alkyl having a carbon number of from 1 to 8, arbitrary hydrogen may be replaced by fluorine, and arbitrary —CH$_2$— may be replaced by —O— or cycloalkylene; in the phenyl, arbitrary hydrogen may be replaced by halogen, methyl or methoxy; the phenylalkyl is constituted by phenyl, arbitrary hydrogen of which may be replaced by halogen, alkyl having a carbon number of from 1 to 4, or methoxy, and alkylene having a carbon number of from 1 to 8, arbitrary —CH$_2$— of which may be replaced by —O— or cycloalkylene; in the case where the phenyl has plural substituents, the substituents may be the same groups or different groups; in each of formula (a) and formula (b), at least one of X represents hydrogen, chlorine or a group having one of —CH=CH—, —C≡C—, —OH, —COOH, —COO—, 2-oxapropane-1,3-dioyl, oxiranyl, oxiranylene, oxetanyl, oxetanylene, 3,4-epoxycyclohexyl, —SH, —NH— and —NH$_2$, and the balance of X each represents a group defined as similar to $R^0$; and in formula (b), Z represents —O—.

[4] The polymer as described in the item [2], wherein all $R^0$ each represents the same group selected from alkyl having a carbon number of from 1 to 8, naphthyl, phenyl and phenylalkyl; in the alkyl having a carbon number of from 1 to 8, arbitrary hydrogen may be replaced by fluorine, and arbitrary —CH$_2$— may be replaced by —O— or cycloalkylene; in the phenyl, arbitrary hydrogen may be replaced by halogen, methyl or methoxy; the phenylalkyl is constituted by phenyl, arbitrary hydrogen of which may be replaced by halogen, alkyl having a carbon number of from 1 to 4, or methoxy, and alkylene having a carbon number of from 1 to 8, arbitrary —CH$_2$— of which may be replaced by —O— or cycloalkylene; in the case where the phenyl has plural substituents, the substituents may be the same groups or different groups; in each of formula (a) and formula (b), one of X represents hydrogen, chlorine or a group having one of —CH=CH—, —C≡C—, —OH, —COOH, —COO—, 2-oxapropane-1,3-dioyl, oxiranyl, oxiranylene, oxetanyl, oxetanylene, 3,4-epoxycyclohexyl, —SH, —NH— and —NH$_2$, and the balance of X each represents a group defined as similar to $R^0$; and in formula (b), Z represents —O—.

[5] The polymer as described in the item [2], wherein all $R^0$ each represents the same group selected from unsubstituted phenyl, cyclopentyl and cyclohexyl; in each of formula (a) and formula (b), one of X represents hydrogen, chlorine or a group having one of —CH=CH—, —C≡C—, —OH, —COOH, —COO—, 2-oxapropane-1,3-dioyl, oxiranyl, oxiranylene, oxetanyl, oxetanylene, 3,4-epoxycyclohexyl, —SH, —NH— and —NH$_2$, and the balance of X each represents a group defined as similar to $R^0$; and in formula (b), Z represents —O—.

[6] The polymer as described in the item [2], which is obtained by using a silsesquioxane derivative represented by formula (1-1) and a compound having at least two Si—H groups:

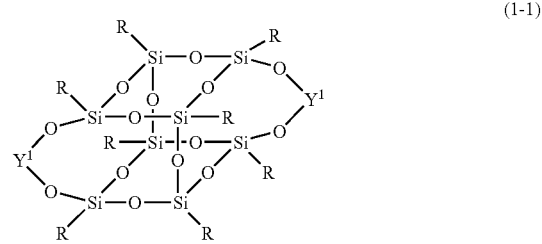

wherein R each independently represents alkyl, aryl or arylalkyl; in the alkyl, the number of carbon atoms is from 1 to 40, arbitrary hydrogen may be replaced by fluorine, and arbitrary —CH$_2$— may be replaced by —O—, —CH=CH—, cycloalkylene or cycloalkenylene; in the aryl, arbitrary hydrogen may be replaced by halogen or alkyl having a carbon number of from 1 to 20; the arylalkyl is constituted by aryl, arbitrary hydrogen of which may be replaced by halogen or alkyl having a carbon number of from 1 to 20, and alkylene, arbitrary hydrogen of which may be replaced by fluorine, and arbitrary —CH$_2$— of which may be replaced by —O—, —CH=CH— or cycloalkylene; in the alkyl having a carbon number of from 1 to 20 as a substituent of the aryl, arbitrary hydrogen may be replaced by fluorine, and arbitrary —CH$_2$— may be replaced by —O—, —CH=CH—, cycloalkylene or phenylene; and $Y^1$ each represents a group represented by formula (a-1) or formula (b-1):

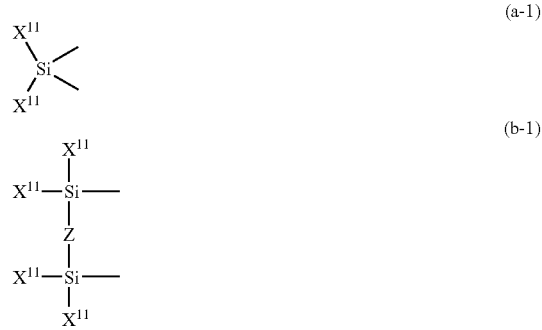

in each of formula (a-1) and formula (b-1), at least one of $X^{11}$ represents alkenyl, and the balance of $X^{11}$ each independently represents chlorine, a group defined as similar to R, or a group having one of —OH, —COOH, —COO—, 2-oxapropane-1, 3-dioyl, oxiranyl, oxiranylene, oxetanyl, oxetanylene, 3,4- epoxycyclohexyl, —SH, —NH—, —NH₂, —CN and —O—; and in formula (b-1), Z represents a single bond, —O— or —CH₂—.

[7] The polymer as described in the item [6], which is obtained by using a silsesquioxane derivative represented by formula (1-1) and at least one compound selected from a silsesquioxane derivative represented by formula (1-2), a compound represented by formula (2-1), a compound represented by formula (3-1), a compound represented by formula (4-1), a compound represented by formula (5-1) and a compound represented by formula (6-1):

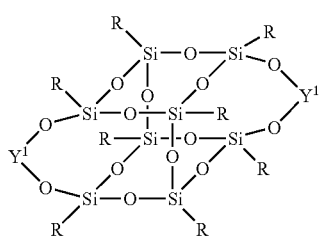
(1-1)

wherein R each independently represents alkyl, aryl or arylalkyl; in the alkyl, the number of carbon atoms is from 1 to 40, arbitrary hydrogen may be replaced by fluorine, and arbitrary —CH₂— may be replaced by —O—, —CH=CH—, cycloalkylene or cycloalkenylene; in the aryl, arbitrary hydrogen may be replaced by halogen or alkyl having a carbon number of from 1 to 20; the arylalkyl is constituted by aryl, arbitrary hydrogen of which may be replaced by halogen or alkyl having a carbon number of from 1 to 20, and alkylene, arbitrary hydrogen of which may be replaced by fluorine, and arbitrary —CH₂— of which may be replaced by —O—, —CH=CH— or cycloalkylene; in the alkyl having a carbon number of from 1 to 20 as a substituent of the aryl, arbitrary hydrogen may be replaced by fluorine, and arbitrary —CH₂— may be replaced by —O—, —CH=CH—, cycloalkylene or phenylene; and $Y^1$ each represents a group represented by formula (a-1) or formula (b-1):

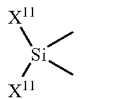
(a-1)

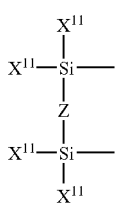
(b-1)

in each of formula (a-1) and formula (b-1), at least one of $X^{11}$ represents alkenyl, and the balance of $X^{11}$ each independently represents chlorine, a group defined as similar to R, or a group having one of —OH, —COOH, —COO—, 2-oxapropane-1,3-dioyl, oxiranyl, oxiranylene, oxetanyl, oxetanylene, 3,4-epoxycyclohexyl, —SH, —NH—, —NH₂, —CN and —O—; and in formula (b-1), Z represents a single bond, —O— or —CH₂—:

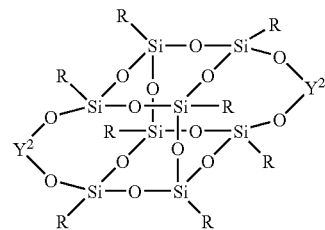
(1-2)

wherein R each represents a group defined as similar to R in formula (1-1); and $Y^2$ each represents a group represented by formula (a-2) or formula (b-2):

(a-2)

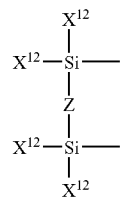
(b-2)

in each of formula (a-2) and formula (b-2), at least one of $X^{12}$ represents hydrogen, and the balance of $X^{12}$ each independently represents chlorine, a group defined as similar to R, or a group having one of —OH, —COOH, —COO—, 2-oxapropane-1,3-dioyl, oxiranyl, oxiranylene, oxetanyl, oxetanylene, 3,4-epoxycyclohexyl, —SH, —NH—, —NH₂, —CN and —O—; and in formula (b-2), Z represents a single bond, —O— or —CH₂—:

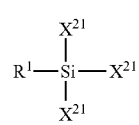
(2-1)

wherein $R^1$ represents a group defined as similar to R in formula (1-1); and at least two of $X^{21}$ each represents hydrogen, and the balance of $X^{21}$ each independently represents $R^1$:

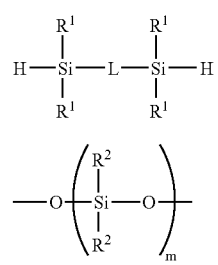
(3-1)

(c)

wherein $R^1$ each represents a group defined as similar to R in formula (1-1); L represents a single bond, —O—, —CH$_2$—, —(CH$_2$)$_2$—, —(CH$_2$)$_3$—, —(CH$_2$)$_4$—, 1,4-phenylene, 4,4'-diphenylene, 4,4'-oxy-1,1'-diphenylene or a group represented by formula (c); $R^2$ each represents a group defined as similar to $R^1$; and m represents an integer of from 1 to 30:

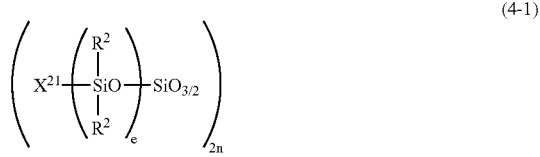

(4-1)

wherein $R^2$ each represents a group defined as similar to $R^1$ in formula (2-1); at least two of $X^{21}$ each represents hydrogen, and the balance of $X^{21}$ each represents a group defined as similar to R in formula (1-1); e represents 0 or 1; and n represents an integer of from 3 to 30:

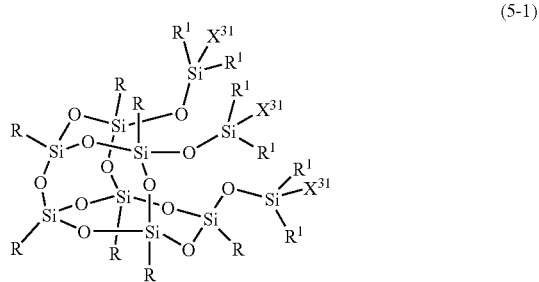

(5-1)

wherein R and $R^1$ each represents a group defined as similar to R in formula (1-1); and at least two of $X^{31}$ each represents hydrogen, and the balance of $X^{31}$ each represents $R^1$:

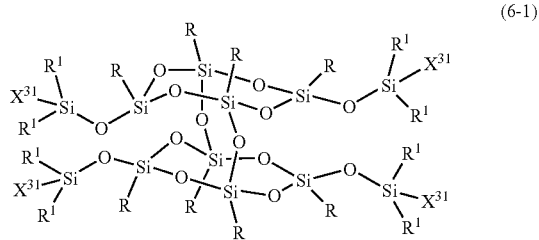

(6-1)

wherein R and $R^1$ each represents a group defined as similar to R in formula (1-1); and at least two of $X^{31}$ each represents hydrogen, and the balance of $X^{31}$ each represents a group defined as similar to $R^1$.

The polymer as described in the item [7], wherein in each of formula (a-1) and formula (b-1), at least one of $X^{11}$ represents alkenyl, and the balance of $X^{11}$ each represents chlorine or a group defined as similar to R in formula (1-1); in each of formula (a-2) and formula (b-2), at least one of $x^{12}$ represents hydrogen, and the balance of $X^{12}$ each represents chlorine or a group defined as similar to R in formula (1-1).

[9] The polymer as described in the item [7], wherein in formula (1-1), R each independently represents alkyl having a carbon number of from 1 to 8, naphthyl, phenyl or phenylalkyl; in the alkyl having a carbon number of from 1 to 8, arbitrary hydrogen may be replaced by fluorine, and arbitrary —CH$_2$— may be replaced by —O— or cycloalkylene; in the phenyl, arbitrary hydrogen may be replaced by halogen, methyl or methoxy; the phenylalkyl is constituted by phenyl, arbitrary hydrogen of which may be replaced by halogen, alkyl having a carbon number of from 1 to 4 or methoxy, and alkylene having a carbon number of from 1 to 8, arbitrary —CH$_2$— of which may be replaced by —O— or cycloalkylene; in the case where the phenyl has plural substituents, the substituents may be the same groups or different groups; in each of formula (a-1) and formula (b-1), at least one of $X^{11}$ represents alkenyl, and the balance of $X^{11}$ each represents a group defined as similar to R in formula (1-1); in each of formula (a-2) and formula (b-2), at least one of $X^{12}$ represents hydrogen, and the balance of $X^{12}$ each represents a group defined as similar to R in formula (1-2); and in formula (b-1) and formula (b-2), Z represents —O—.

[10] The polymer as described in the item [7], wherein in formula (1-1), all R each represents the same group selected from alkyl having a carbon number of from 1 to 8, naphthyl, phenyl and phenylalkyl; in the alkyl having a carbon number of from 1 to 8, arbitrary hydrogen may be replaced by fluorine, and arbitrary —CH$_2$— may be replaced by —O— or cycloalkylene; in the phenyl, arbitrary hydrogen may be replaced by halogen, methyl or methoxy; the phenylalkyl is constituted by phenyl, arbitrary hydrogen of which may be replaced by halogen, alkyl having a carbon number of from 1 to 4 or methoxy, and alkylene having a carbon number of from 1 to 8, arbitrary —CH$_2$— of which may be replaced by —O— or cycloalkylene; in the case where the phenyl has plural substituents, the substituents may be the same groups or different groups; in each of formula (a-1) and formula (b-1), at least one of $X^{11}$ represents alkenyl, and the balance of $X^{11}$ each represents a group defined as similar to R in formula (1-1); in each of formula (a-2) and formula (b-2), at least one of $X^{12}$ represents hydrogen, and the balance of $X^{12}$ each represents a group defined as similar to R in formula (1-2); and in formula (b-1) and formula (b-2), Z represents —O—.

[11] The polymer as described in the item [7], wherein in formula (1-1), all R each represents the same group selected from unsubstituted phenyl, cyclopentyl and cyclohexyl; in each of formula (a-1) and formula (b-1), one of $X^{11}$ represents alkenyl, and the balance of $X^{11}$ each represents alkyl having a carbon number of from 1 to 8, unsubstituted phenyl, cyclopentyl or cyclohexyl; in each of formula (a-2) and formula (b-2), one of $X^{12}$ represents hydrogen, and the balance of $X^{12}$ each represents alkyl having a carbon number of from 1 to 8, unsubstituted phenyl, cyclopentyl or cyclohexyl; in formula (b-1) and formula (b-2), Z represents —O—; in each of formula (2-1), formula (3-1), formula (5-1) and formula (6-1), $R^1$ each represents alkyl having a carbon number of from 1 to 8, unsubstituted phenyl, cyclopentyl or cyclohexyl; in formula (2-1), two of $X^{21}$ each represents hydrogen, and the balance of $X^{21}$ each represents $R^1$; and in formula (4-1), two of $X^{21}$ each represents hydrogen, and the balance thereof each represents a group defined as similar to R in formula (1-1).

[12] The polymer as described in the item [7], wherein in formula (1-1), all R each represents the same group selected from unsubstituted phenyl, cyclopentyl and cyclohexyl; in each of formula (a-1) and formula (b-1), one of $X^{11}$ represents vinyl, allyl or styryl, and the balance of $X^{11}$ each represents alkyl having a carbon number of from 1 to 8, unsubstituted phenyl, cyclopentyl or cyclohexyl; in each of formula (a-2) and formula (b-2), one of $X^{12}$ represents hydrogen, and the balance of $X^{12}$ each represents alkyl having a carbon number of from 1 to 8, unsubstituted phenyl, cyclopentyl or cyclohexyl; in formula (b-1) and formula (b-2), Z represents —O—; in each of formula (2-1), formula (3-1), formula (5-1) and formula (6-1), $R^1$ each represents alkyl having a carbon number of from 1 to 8, unsubstituted phenyl, cyclopentyl or cyclohexyl; in formula (2-1), two of $X^{21}$ each represents hydrogen, and the balance of $X^{21}$ each represents $R^1$; and in formula (4-1), two of $X^{21}$ each represents hydrogen, and the balance thereof each represents a group defined as similar to R in formula (1-1).

[13] The polymer as described in the item [7], wherein in formula (1-1), all R each represents unsubstituted phenyl; in each of formula (a-1) and formula (b-1), one of $X^{11}$ represents vinyl, allyl or styryl, and the balance of $X^{11}$ each represents alkyl having a carbon number of from 1 to 4 or unsubstituted phenyl; in each of formula (a-2) and formula (b-2), one of $X^{12}$ represents hydrogen, and the balance of $X^{12}$ each represents alkyl having a carbon number of from 1 to 4 or unsubstituted phenyl; in formula (b-1) and formula (b-2), Z represents —O—; in each of formula (2-1), formula (3-1), formula (5-1) and formula (6-1), $R^1$ each represents alkyl having a carbon number of from 1 to 4 or unsubstituted phenyl; in formula (2-1), two of $X^{21}$ each represents hydrogen, and the balance of $X^{21}$ each represents $R^1$; and in formula (4-1), two of $X^{21}$ each represents hydrogen, and the balance thereof each represents unsubstituted phenyl.

[14] The polymer as described in the item [2], which is obtained by using a silsesquioxane derivative represented by (1-2) and a compound having at least two alkenyls or a compound having a carbon-carbon triple bond:

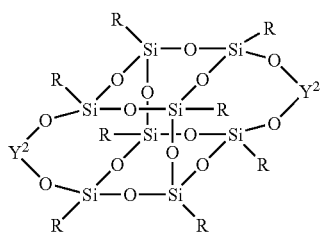
(1-2)

wherein R each independently represents alkyl, aryl or arylalkyl; in the alkyl, the number of carbon atoms is from 1 to 40, arbitrary hydrogen may be replaced by fluorine, and arbitrary —CH$_2$— may be replaced by —O—, —CH=CH—, cycloalkylene or cycloalkenylene; in the aryl, arbitrary hydrogen may be replaced by halogen or alkyl having a carbon number of from 1 to 20; the arylalkyl is constituted by aryl, arbitrary hydrogen of which may be replaced by halogen or alkyl having a carbon number of from 1 to 20, and alkylene, arbitrary hydrogen of which may be replaced by fluorine, and arbitrary —CH$_2$— of which may be replaced by —O—, —CH=CH— or cycloalkylene; in the alkyl having a carbon number of from 1 to 20 as a substituent of the aryl, arbitrary hydrogen may be replaced by fluorine, and arbitrary —CH$_2$— may be replaced by —O—, —CH=CH—, cycloalkylene or phenylene; and $Y^2$ each represents a group represented by formula (a-2) or formula (b-2):

(a-2)

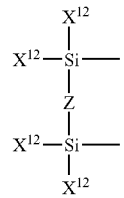
(b-2)

in each of formula (a-2) and formula (b-2), at least one of $X^{12}$ represents hydrogen, and the balance of $X^{12}$ each independently represents chlorine, a group defined as similar to R, or a group having one of —OH, —COOH, —COO—, 2-oxapropane-1,3-dioyl, oxiranyl, oxiranylene, oxetanyl, oxetanylene, 3,4-epoxycyclohexyl, —SH, —NH—, —NH$_2$, —CN and —O—; and in formula (b-2), Z represents a single bond, —O— or —CH$_2$—.

[15] The polymer as described in the item [14], which is obtained by using a silsesquioxane derivative represented by formula (1-2) and at least one compound of a compound represented by formula (2-2), a compound represented by formula (3-2), a compound represented by formula (4-2), a compound represented by formula (5-2), a compound represented by formula (6-2), a compound represented by formula (d-1), a compound represented by formula (d-2), a compound represented by formula (d-3) and a compound represented by formula (d-4):

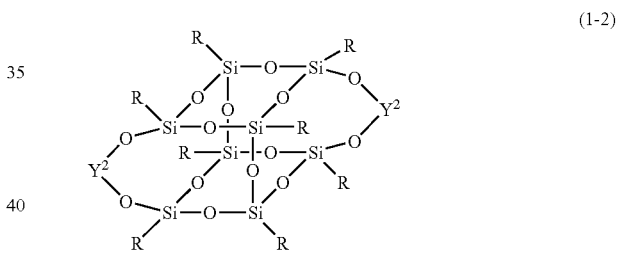
(1-2)

wherein R each independently represents alkyl, aryl or arylalkyl; in the alkyl, the number of carbon atoms is from 1 to 40, arbitrary hydrogen may be replaced by fluorine, and arbitrary —CH$_2$— may be replaced by —O—, —CH=CH—, cycloalkylene or cycloalkenylene; in the aryl, arbitrary hydrogen may be replaced by halogen or alkyl having a carbon number of from 1 to 20; the arylalkyl is constituted by aryl, arbitrary hydrogen of which may be replaced by halogen or alkyl having a carbon number of from 1 to 20, and alkylene, arbitrary hydrogen of which may be replaced by fluorine, and arbitrary —CH$_2$— of which may be replaced by —O—, —CH=CH— or cycloalkylene; in the alkyl having a carbon number of from 1 to 20 as a substituent of the aryl, arbitrary hydrogen may be replaced by fluorine, and arbitrary —CH$_2$— may be replaced by —O—, —CH=CH—, cycloalkylene or phenylene; and $Y^2$ each represents a group represented by formula (a-2) or formula (b-2):

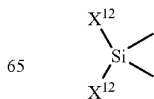
(a-2)

-continued

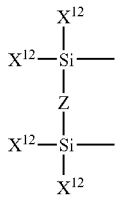
(b-2)

in each of formula (a-2) and formula (b-2), at least one of $X^{12}$ represents hydrogen, and the balance of $X^{12}$ each independently represents chlorine, a group defined as similar to R, or a group having one of —OH, —COOH, —COO—, 2-oxapropane-1,3-dioyl, oxiranyl, oxiranylene, oxetanyl, oxetanylene, 3,4-epoxycyclohexyl, —SH, —NH—, —NH$_2$, —CN and —O—; and in formula (b-2), Z represents a single bond, —O— or —CH$_2$—:

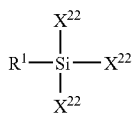
(2-2)

wherein $R^1$ represents a group defined as similar to R in formula (1-2); and at least two of $X^{22}$ each represents alkenyl or a group having a carbon-carbon triple bond, and the balance of $X^{22}$ each independently represents $R^1$:

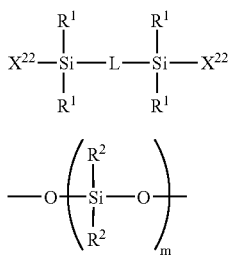
(3-2)

(c)

wherein $R^1$ each represents a group defined as similar to R in formula (1-2); $X^{22}$ each represents alkenyl; L represents a single bond, —O—, —CH$_2$—, —(CH$_2$)$_2$—, —(CH$_2$)$_3$—, —(CH$_2$)$_4$—, 1,4-phenylene, 4,4'-diphenylene, 4,4'-oxy-1,1'-diphenylene or a group represented by formula (c); $R^2$ each represents a group defined as similar to $R^1$; and m represents an integer of from 1 to 30:

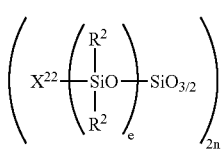
(4-2)

wherein $R^2$ each represents a group defined as similar to $R^1$ in formula (2-2); at least two of $X^{22}$ each represents alkenyl, and the balance of $X^{22}$ each represents a group defined as similar to R in formula (1-2); e represents 0 or 1; and n represents an integer of from 3 to 30:

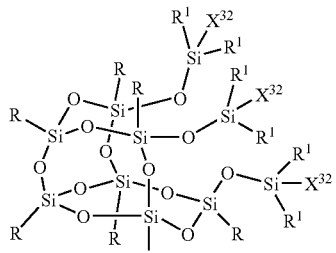
(5-2)

whrein R and $R^1$ each represents a group defined as similar to R in formula (1-2); and at least two Of $X^{32}$ each represents alkenyl, and the balance of $X^{32}$ each represents $R^1$:

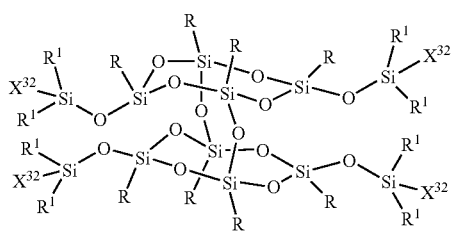
(6-2)

wherein R and $R^1$ each represents a group defined as similar to R in formula (1-2); and at least two of $X^{32}$ each represents alkenyl, and the balance of $X^{32}$ each represents $R^1$;

$$H_2C=CH-R^3-CH=CH_2 \quad (d-1)$$

$$HC\equiv C-R^3-C\equiv CH \quad (d-2)$$

$$R^4-C\equiv C-R^4 \quad (d-3)$$

$$R^4-C\equiv C-C\equiv C-R^4 \quad (d-4)$$

wherein each of formula (d-1) to formula (d-4), $R^3$ each represents alkylene having a carbon number of from 1 to 40 or phenylene, arbitrary hydrogen of which may be replaced by halogen or alkyl having a carbon number of from 1 to 4; $R^4$ each represents alkyl having a carbon number of from 1 to 8 or phenyl, arbitrary hydrogen of which may be replaced by halogen or alkyl having a carbon number of from 1 to 4; in each of the alkylene having a carbon number of from 1 to 40 and the alkyl having a carbon number of from 1 to 8, arbitrary —CH$_2$— may be replaced by —O— or —COO—.

[16] The polymer as described in the item [15], wherein in each of formula (a-2) and formula (b-2), at least one of $X^{12}$ represents hydrogen, and the balance of $X^{12}$ each independently represents chlorine or a group defined as similar to R in formula (1-2).

[17] The polymer as described in the item [15], wherein in formula (1-2), R each independently represents alkyl having a carbon number of from 1 to 8, naphthyl, phenyl or phenylalkyl; in the alkyl having a carbon number of from 1 to 8, arbitrary hydrogen may be replaced by fluorine, and arbitrary —CH$_2$— may be replaced by —O— or cycloalkylene; in the phenyl, arbitrary hydrogen may be replaced by halogen, methyl or methoxy; the phenylalkyl is constituted by phenyl, arbitrary hydrogen of which may be replaced by halogen, alkyl having a carbon number of from 1 to 4 or methoxy, and alkylene having a carbon number of from 1 to 8, arbitrary —$CH_2$— of which may be replaced by —O— or cycloalkylene; in the case where the phenyl has plural substituents, the substituents may be the same groups or different groups; in each of formula (a-2) and formula (b-2), at least one of $X^{12}$ represents hydrogen, and the balance of $X^{12}$ each represents a group defined as similar to R in formula (1-2); and in formula (b-2), Z represents —O—.

[18] The polymer as described in the item [15], wherein in formula (1-2), all R each represents the same group selected from alkyl having a carbon number of from 1 to 8, naphthyl, phenyl and phenylalkyl; in the alkyl having a carbon number of from 1 to 8, arbitrary hydrogen may be replaced by fluorine, and arbitrary —$CH_2$— may be replaced by —O— or cycloalkylene; in the phenyl, arbitrary hydrogen may be replaced by halogen, methyl or methoxy; the phenylalkyl is constituted by phenyl, arbitrary hydrogen of which may be replaced by halogen, alkyl having a carbon number of from 1 to 4 or methoxy, and alkylene having a carbon number of from 1 to 8, arbitrary —$CH_2$— of which may be replaced by —O— or cycloalkylene; in the case where the phenyl has plural substituents, the substituents may be the same groups or different groups; in each of formula (a-2) and formula (b-2), at least one of $X^{12}$ represents hydrogen, and the balance of $X^{12}$ each represents a group defined as similar to R in formula (1-2); and in formula (b-2), Z represents —O—.

[19] The polymer as described in the item [15], wherein in formula (1-2), all R each represents the same group selected from unsubstituted phenyl, cyclopentyl and cyclohexyl; in each of formula (a-2) and formula (b-2), one of $X^{12}$ represents hydrogen, and the balance of $X^{12}$ each represents alkyl having a carbon number of from 1 to 8, unsubstituted phenyl, cyclopentyl or cyclohexyl; in formula (b-2), Z represents —O—; in each of formula (2-2), formula (3-2), formula (5-2) and formula (6-2), $R^1$ each represents alkyl having a carbon number of from 1 to 8, unsubstituted phenyl, cyclopentyl or cyclohexyl.

[20] The polymer as described in the item [15], wherein in formula (1-2), all R each represents the same group selected from unsubstituted phenyl, cyclopentyl and cyclohexyl; in each of formula (a-2) and formula (b-2), one of $X^{12}$ represents hydrogen, and the balance of $X^{12}$ each represents alkyl having a carbon number of from 1 to 8, unsubstituted phenyl, cyclopentyl or cyclohexyl; in formula (b-2), Z represents —O—; in each of formula (2-2), formula (3-2), formula (5-2) and formula (6-2), $R^1$ each represents alkyl having a carbon number of from 1 to 8, unsubstituted phenyl, cyclopentyl or cyclohexyl; in formula (2-2), two of $X^{22}$ each represents vinyl, allyl or styryl, and the balance of $X^{22}$ each represents $R^1$; in formula (3-2), $X^{22}$ represents vinyl, allyl or styryl; in formula (4-2), two of $X^{22}$ each represents vinyl, allyl or styryl, and the balance of $X^{22}$ each represents a group defined as similar to R in formula (1-2); and in each of formula (5-2) and formula (6-2), at least two of $X^{32}$ each represents vinyl, allyl or styryl, and the balance of $X^{32}$ each represents $R^1$.

[21] The polymer as described in the item [15], wherein in formula (1-2), all R each represents unsubstituted phenyl; in each of formula (a-2) and formula (b-2), one of $X^{12}$ represents hydrogen, and the balance of $X^{12}$ each represents alkyl having a carbon number of from 1 to 4 or unsubstituted phenyl; in formula (b-2), Z represents —O—; in each of formula (2-2), formula (3-2), formula (5-2) and formula (6-2), $R^1$ each represents alkyl having a carbon number of from 1 to 4 or unsubstituted phenyl; in formula (2-2), two of $X^{22}$ each represents vinyl, allyl or styryl, and the balance of $X^{22}$ each represents $R^1$; in formula (3-2), $X^{22}$ represents vinyl, allyl or styryl; in formula (4-2), two of $X^{22}$ each represents vinyl, allyl or styryl, and the balance of $X^{22}$ each represents unsubstituted phenyl; and in each of formula (5-2) and formula (6-2), at least two of $X^{32}$ each represents vinyl, allyl or styryl, and the balance of $X^{32}$ each represents $R^1$.

[22] A process for producing the polymer as described in the item [7], characterized by reacting a silsesquioxane derivative represented by formula (1-1) with at least one of a silsesquioxane derivative represented by formula (1-2), a compound represented by formula (2-1), a compound represented by formula (3-1), a compound represented by formula (4-1), a compound represented by formula (5-1) and a compound represented by formula (6-1) in the presence of a hydrosilylation catalyst:

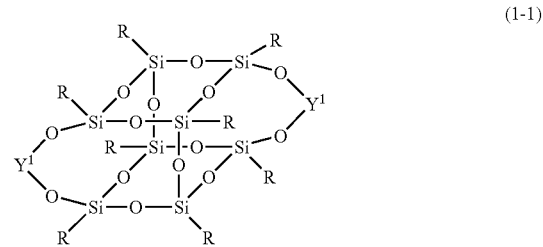

(1-1)

wherein R each independently represents alkyl, aryl or arylalkyl; in the alkyl, the number of carbon atoms is from 1 to 40, arbitrary hydrogen may be replaced by fluorine, and arbitrary —$CH_2$— may be replaced by —O—, —CH=CH—, cycloalkylene or cycloalkenylene; in the aryl, arbitrary hydrogen may be replaced by halogen or alkyl having a carbon number of from 1 to 20; the arylalkyl is constituted by aryl, arbitrary hydrogen of which may be replaced by halogen or alkyl having a carbon number of from 1 to 20, and alkylene, arbitrary hydrogen of which may be replaced by fluorine, and arbitrary —$CH_2$— of which may be replaced by —O—, —CH=CH— or cycloalkylene; in the alkyl having a carbon number of from 1 to 20 as a substituent of the aryl, arbitrary hydrogen may be replaced by fluorine, and arbitrary —$CH_2$— may be replaced by —O—, —CH=CH—, cycloalkylene or phenylene; and $Y^1$ each represents a group represented by formula (a-1) or formula (b-1):

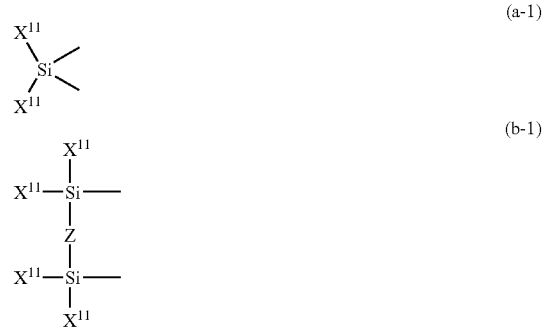

in each of formula (a-1) and formula (b-1), at least one of $X^{11}$ represents alkenyl, and the balance of $X^{11}$ each independently represents chlorine, a group defined as similar to R, or a group having one of —OH, —COOH, —COO—, 2-oxapropane-1, 3-dioyl, oxiranyl, oxiranylene, oxetanyl, oxetanylene, 3,4-epoxycyclohexyl, —SH, —NH—, —NH$_2$, —CN and —O—; and in formula (b-1), Z represents a single bond, —O— or —CH$_2$—:

(1-2)

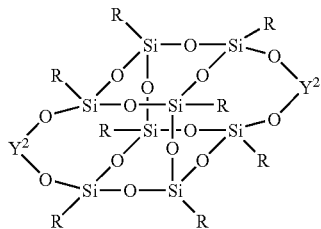

wherein R each represents a group defined as similar to R in formula (1-1); and Y$^2$ each represents a group represented by formula (a-2) or formula (b-2):

(a-2)

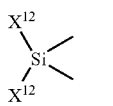

(b-2)

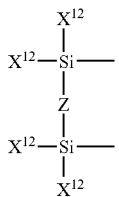

in each of formula (a-2) and formula (b-2), at least one of X$^{12}$ represents hydrogen, and the balance of X$^{12}$ each independently represents chlorine, a group defined as similar to R, or a group having one of —OH, —COOH, —COO—, 2-oxapropane-1,3-dioyl, oxiranyl, oxiranylene, oxetanyl, oxetanylene, 3,4-epoxycyclohexyl, —SH, —NH—, —NH$_2$, —CN and —O—; and in formula (b-2), Z represents a single bond, —O— or —CH$_2$—:

(2-1)

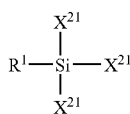

wherein R$^1$ represents a group defined as similar to R in formula (1-1); and at least two of X$^{21}$ each represents hydrogen, and the balance of X$^{21}$ each independently represents R$^1$:

(3-1)

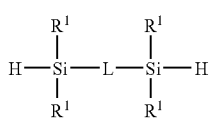

-continued (c)

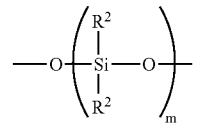

wherein R$^1$ each represents a group defined as similar to R in formula (1-1); L represents a single bond, —O—, —CH$_2$—, —(CH$_2$)$_2$—, —(CH$_2$)$_3$—, —(CH$_2$)$_4$—, 1,4-phenylene, 4,4'-diphenylene, 4,4'-oxy-1,1'-diphenylene or a group represented by formula (c); R$^2$ each represents a group defined as similar to R$^1$; and m represents an integer of from 1 to 30:

(4-1)

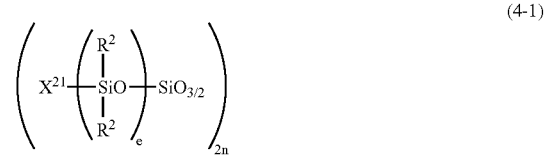

wherein R$^2$ each represents a group defined as similar to R$^1$ in formula (2-1); at least two of X$^{21}$ each represents hydrogen, and the balance of X$^{21}$ each represents a group defined as similar to R in formula (1-1); e represents 0 or 1; and n represents an integer of from 3 to 30:

(5-1)

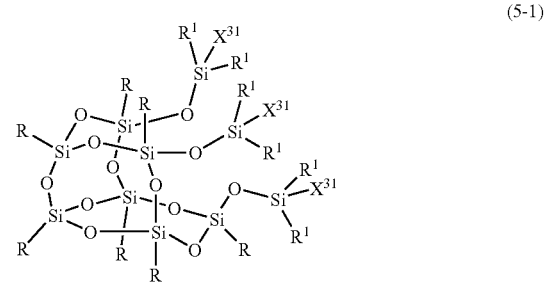

wherein R and R$^1$ each represents a group defined as similar to R in formula (1-1); and at least two of X$^{31}$ each represents hydrogen, and the balance of X$^{31}$ each represents R$^1$:

(6-1)

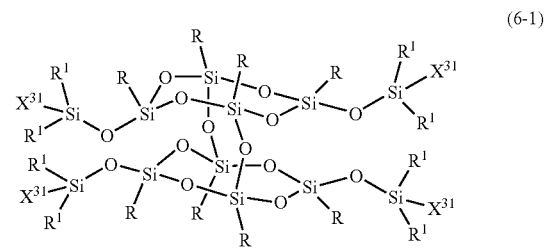

wherein R and R$^1$ each represents a group defined as similar to R in formula (1-1); and at least two of X$^{31}$ each represents hydrogen, and the balance of X$^{31}$ each represents a group defined as similar to R$^1$.

[23] A process for producing the polymer as described in the item [15], characterized by reacting a silsesquioxane derivative represented by formula (1-2) with at least one of a compound represented by formula (2-2), a compound represented by formula (3-2), a compound represented by formula (4-2), a compound represented by formula (5-2), a compound represented by formula (6-2), a compound represented by formula (d-1), a compound represented by formula (d-2), a compound represented by formula (d-3) and a compound represented by formula (d-4) in the presence of a hydrosilylation catalyst:

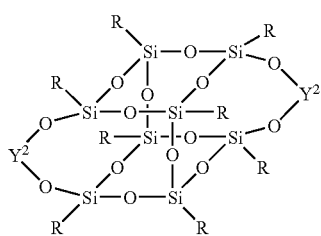
(1-2)

wherein R each independently represents alkyl, aryl or arylalkyl; in the alkyl, the number of carbon atoms is from 1 to 40, arbitrary hydrogen may be replaced by fluorine, and arbitrary —CH$_2$— may be replaced by —O—, —CH═CH—, cycloalkylene or cycloalkenylene; in the aryl, arbitrary hydrogen may be replaced by halogen or alkyl having a carbon number of from 1 to 20; the arylalkyl is constituted by aryl, arbitrary hydrogen of which may be replaced by halogen or alkyl having a carbon number of from 1 to 20, and alkylene, arbitrary hydrogen of which may be replaced by fluorine, and arbitrary —CH$_2$— of which may be replaced by —O—, —CH═CH— or cycloalkylene; in the alkyl having a carbon number of from 1 to 20 as a substituent of the aryl, arbitrary hydrogen may be replaced by fluorine, and arbitrary —CH$_2$— may be replaced by —O—, —CH═CH—, cycloalkylene or phenylene; and Y$^2$ each represents a group represented by formula (a-2) or formula (b-2):

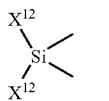
(a-2)

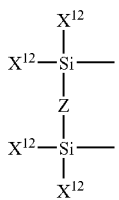
(b-2)

in each of formula (a-2) and formula (b-2), at least one of X$^{12}$ represents hydrogen, and the balance of X$^{12}$ each independently represents chlorine, a group defined as similar to R, or a group having one of —OH, —COOH, —COO—, 2-oxapropane-1,3-dioyl, oxiranyl, oxiranylene, oxetanyl, oxetanylene, 3,4-epoxycyclohexyl, —SH, —NH—, —NH$_2$, —CN and —O—; and in formula (b-2), Z represents a single bond, —O— or —CH$_2$—:

(2-2)

wherein R$^1$ represents a group defined as similar to R in formula (1-2); and at least two of X$^{22}$ each represents alkenyl or a group having a carbon-carbon triple bond, and the balance of X$^{22}$ each independently represents R$^1$:

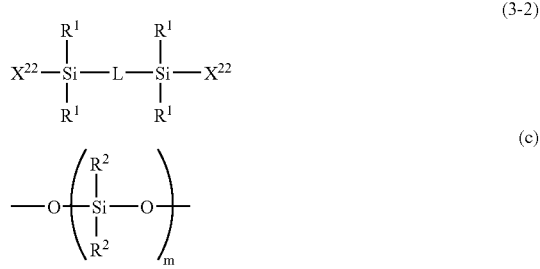
(3-2)

(c)

wherein R$^1$ each represents a group defined as similar to R in formula (1-2); X$^{22}$ each represents alkenyl; L represents a single bond, —O—, —CH$_2$—, —(CH$_2$)$_2$—, —(CH$_2$)$_3$—, —(CH$_2$)$_4$—, 1,4-phenylene, 4,4'-diphenylene, 4,4'-oxy-1,1'-diphenylene or a group represented by formula (c); R$^2$ each represents a group defined as similar to R$^1$; and m represents an integer of from 1 to 30:

(4-2)

wherein R$^2$ each represents a group defined as similar to R$^1$ in formula (2-2); at least two of X$^{22}$ each represents alkenyl, and the balance of X$^{22}$ each represents a group defined as similar to R in formula (1-2); e represents 0 or 1; and n represents an integer of from 3 to 30:

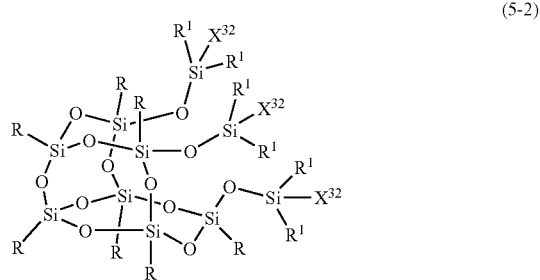
(5-2)

wherein R and R$^1$ each represents a group defined as similar to R in formula (1-2); and at least two of X$^{32}$ each represents alkenyl, and the balance of X$^{32}$ each represents R$^1$:

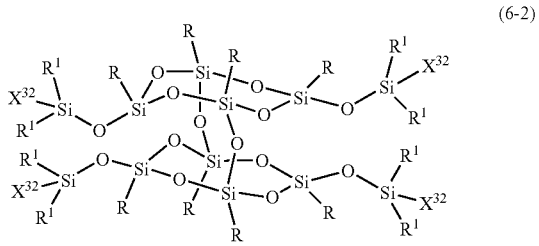

(6-2)

wherein R and $R^1$ each represents a group defined as similar to R in formula (1-2); and at least two of $X^{32}$ each represents alkenyl, and the balance of $X^{32}$ each represents $R^1$;

$H_2C{=}CH{-}R^3{-}CH{=}CH_2$      (d-1)

$HC{\equiv}C{-}R^3{-}C{\equiv}CH$      (d-2)

$R^4{-}C{\equiv}C{-}R^4$      (d-3)

$R^4{-}C{\equiv}C{-}C{\equiv}C{-}R^4$      (d-4)

wherein each of formula (d-1) to formula (d-4), $R^3$ each represents alkylene having a carbon number of from 1 to 40 or phenylene, arbitrary hydrogen of which may be replaced by halogen or alkyl having a carbon number of from 1 to 4; $R^4$ each represents alkyl having a carbon number of from 1 to 8 or phenyl, arbitrary hydrogen of which may be replaced by halogen or alkyl having a carbon number of from 1 to 4; in each of the alkylene having a carbon number of from 1 to 40 and the alkyl having a carbon number of from 1 to 8, arbitrary —$CH_2$— may be replaced by —O— or —COO—.

[24] A coating film obtained by using the polymer as described in the item [7].

[25] A coating film obtained by using the polymer as described in the item [15].

[26] A film for preventing elution of metallic ions obtained by using the polymer as described in the item [7].

[27] A film for preventing elution of metallic ions obtained by using the polymer as described in the item [15].

[28] The polymer as described in the item [2], which is obtained by using a silsesquioxane derivative represented by formula (1-4) and a compound having at least two groups capable of reacting with a reactive group in the silsesquioxane derivative:

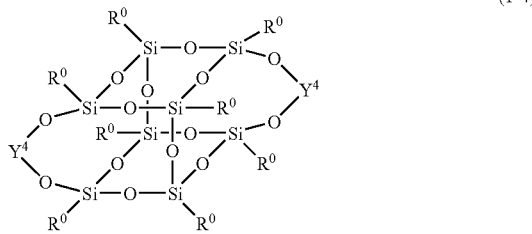

(1-4)

wherein $R^0$ each independently represents hydrogen, alkyl, aryl or arylalkyl; in the alkyl, the number of carbon atoms is from 1 to 40, arbitrary hydrogen may be replaced by fluorine, and arbitrary —$CH_2$— may be replaced by —O—, —CH=CH—, cycloalkylene or cycloalkenylene; in the aryl, arbitrary hydrogen may be replaced by halogen or alkyl having a carbon number of from 1 to 20; the arylalkyl is constituted by aryl, arbitrary hydrogen of which may be replaced by halogen or alkyl having a carbon number of from 1 to 20, and alkylene, arbitrary hydrogen of which may be replaced by fluorine, and arbitrary —$CH_2$— of which may be replaced by —O—, —CH=CH— or cycloalkylene; in the alkyl having a carbon number of from 1 to 20 as a substituent of the aryl, arbitrary hydrogen may be replaced by fluorine, and arbitrary —$CH_2$— may be replaced by —O—, —CH=CH—, cycloalkylene or phenylene; and $Y^4$ each represents a group represented by formula (a-4) or formula (b-4):

(a-4)

(b-4)

wherein $X^4$ each independently represents chlorine, a group defined as similar to $R^0$, or a group having one of —CH=CH—, —C≡C—, —OH, —COOH, —COO—, 2-oxapropane-1,3-dioyl, oxiranyl, oxiranylene, oxetanyl, oxetanylene, 3,4-epoxycyclohexyl, —SH, —NH—, —$NH_2$, —CN and —O—; in each of formula (a-4) and formula (b-4), at least one of $X^4$ represents chlorine or a group having one of —OH, —COOH, —COO—, 2-oxapropane-1,3-dioyl, oxiranyl, oxiranylene, oxetanyl, oxetanylene, 3,4-epoxycyclohexyl, —SH, —NH— and —$NH_2$; and in formula (b-4), Z represents a single bond, —O— or —$CH_2$—.

[29] The polymer as described in the item [28], wherein $R^0$ each independently represents alkyl having a carbon number of from 1 to 8, naphthyl, phenyl or phenylalkyl; in the alkyl having a carbon number of from 1 to 8, arbitrary hydrogen may be replaced by fluorine, and arbitrary —$CH_2$— may be replaced by —O— or cycloalkylene; in the phenyl, arbitrary hydrogen may be replaced by halogen, methyl or methoxy; the phenylalkyl is constituted by phenyl, arbitrary hydrogen of which may be replaced by halogen, alkyl having a carbon number of from 1 to 4, or methoxy, and alkylene having a carbon number of from 1 to 8, arbitrary —$CH_2$— of which may be replaced by —O— or cycloalkylene; in the case where the phenyl has plural substituents, the substituents may be the same groups or different groups; in each of formula (a-4) and formula (b-4), at least one of $X^4$ represents chlorine or a group having one of —OH, —COOH, —COO—, 2-oxapropane-1,3-dioyl, oxiranyl, oxiranylene, oxetanyl, oxetanylene, 3,4-epoxycyclohexyl, —SH, —NH— and —$NH_2$, and the balance of $X^4$ each represents a group defined as similar to $R^0$ in formula (1-4); and in formula (b-4), Z represents —O—.

[30] The polymer as described in the item [28], wherein all $R^0$ each represents the same group selected from alkyl having a carbon number of from 1 to 8, naphthyl, phenyl or phenylalkyl; in the alkyl having a carbon number of from 1 to 8, arbitrary hydrogen may be replaced by fluorine, and arbitrary —$CH_2$— may be replaced by —O— or cycloalkylene; in the phenyl, arbitrary hydrogen may be replaced by halogen, methyl or methoxy; the phenylalkyl is constituted by phenyl, arbitrary hydrogen of which may be replaced by halogen, alkyl having a carbon number of from 1 to 4, or methoxy, and alkylene having a carbon number of from 1 to 8, arbitrary —CH$_2$— of which may be replaced by —O— or cycloalkylene; in the case where the phenyl has plural substituents, the substituents may be the same groups or different groups; in each of formula (a-4) and formula (b-4), at least one of X$^4$ represents chlorine or a group having one of —OH, —COOH, —COO—, 2-oxapropane-1,3-dioyl, oxiranyl, oxiranylene, oxetanyl, oxetanylene, 3,4-epoxycyclohexyl, —SH, —NH— and —NH$_2$, and the balance of X$^4$ each represents a group defined as similar to R$^0$ in formula (1-4); and in formula (b-4), Z represents —O—.

[31] The polymer as described in the item [28], wherein all R$^0$ each represents the same group selected from unsubstituted phenyl, cyclopentyl and cyclohexyl; in each of formula (a-4) and formula (b-4), one of X$^4$ represents chlorine or a group having one of —OH, —COOH, —COO—, 2-oxapropane-1,3-dioyl, oxiranyl, oxiranylene, oxetanyl, oxetanylene, 3,4-epoxycyclohexyl, —SH, —NH— and —NH$_2$, and the balance of X$^4$ each represents a group defined as similar to R$^0$ in formula (1-4); and in formula (b-4), Z represents —O—.

In the following description, the term "silsesquioxane" is sometimes referred to as "PSQ". Therefore, the term "silsesquioxane derivative" is referred to as "PSQ derivative". The PSQ derivative represented by formula (1-0) is sometimes referred to as a compound (1-0). The compound represented by formula (2-1) is sometimes referred to as a compound (2-1). PSQ derivatives and compounds represented by the other formulae are also sometimes simply referred in the same manner. The invention will be described in more detail below.

The invention includes a polymer obtained by using the compound (1-0).

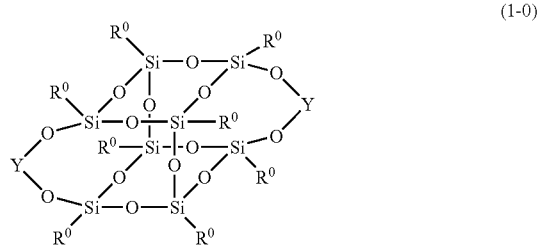

(1-0)

In formula (1-0), R$^0$ each independently represents hydrogen, alkyl, aryl or arylalkyl. All R$^0$ each preferably represents the same one group, and may be constituted by two or more different groups. Examples of the case where eight R$^0$ are constituted by different groups include the case where they are constituted by two or more alkyls, the case where they are constituted by two or more aryls, the case where they are constituted by two or more arylalkyls, the case where they are constituted by hydrogen and at least one aryl, the case where they are constituted by at least one alkyl and at least one aryl, the case where they are constituted by at least one alkyl and at least one arylalkyl, and the case where they are constituted by at least one aryl and at least one arylalkyl. Other combinations than these may be used.

In the case where R$^0$ in formula (1-0) represents alkyl, the number of carbon atoms thereof is from 1 to 40. The carbon number is preferably from 1 to 20. The carbon number is more preferably from 1 to 8. In the alkyl, arbitrary hydrogen may be replaced by fluorine, and arbitrary —CH$_2$— may be replaced by —O—, —CH=CH—, cycloalkylene or cycloalkenylene. Preferred examples of the alkyl include unsubstituted alkyl having a carbon number of from 1 to 20, alkoxyalkyl having a carbon number of from 2 to 20, a group of alkyl having a carbon number of from 1 to 8 where one —CH$_2$— is replaced by cycloalkylene, alkenyl having a carbon number of from 2 to 20, alkenyloxyalkyl having a carbon number of from 2 to 20, alkyloxyalkenyl having a carbon number of from 2 to 20, a group of alkyl having a carbon number of from 1 to 8 where one —CH$_2$— is replaced by cycloalkenylene, and groups enumerated herein where arbitrary hydrogen is replaced by fluorine. The cycloalkylene and the cycloalkenylene each preferably have a carbon number of from 3 to 8.

Examples of the unsubstituted alkyl having a carbon number of from 1 to 20 include methyl, ethyl, propyl, 1-methylethyl, butyl, 2-methylpropyl, 1,1-dimethylethyl, pentyl, hexyl, 1,1,2-trimethylpropyl, heptyl, octyl, 2,4,4-trimethylpentyl, nonyl, decyl, undecyl, dodecyl, tetradecyl, hexadecyl, octadecyl and eicosyl. Examples of the fluorinated alkyl having a carbon number of from 1 to 20 include 3,3,3-trifluoropropyl, 3,3,4,4,5,5,6,6,6-nonafluorohexyl, tridecafluoro-1,1,2,2-tetrahydrooctyl, heptadecafluoro-1,1,2,2-tetrahydrodecyl, perfluoro-1H,1H,2H,2H-dodecyl and perfluoro-1H,1H,2H,2H-tetradecyl. Examples of the alkoxyalkyl having a carbon number of from 2 to 20 include 3-methoxypropyl, methoxyundecyl and 3-heptafluoroisopropoxypropyl. Examples of the group of alkyl having a carbon number of from 1 to 8 where one —CH$_2$— is replaced by cycloalkylene include cyclohexylmethyl, adamantaneethyl, cyclopentyl, cyclohexyl, 2-bicycloheptyl and cyclooctyl. The cyclohexyl is an example where —CH$_2$— of methyl is replaced by cyclohexylene. The cyclohexylmethyl is an example where —CH$_2$— of ethyl is replaced by cyclohexylene.

Examples of the alkenyl having a carbon number of from 2 to 20 include vinyl, 2-propenyl, 3-butenyl, 5-hexenyl, 7-octenyl and 10-undecenyl. Examples of the alkenyloxyalkyl having a carbon number of from 2 to 20 include allyloxyundecyl. Examples of the group of alkyl having a carbon number of from 1 to 8 where one —CH$_2$— is replaced by cycloalkenylene include 2-(3-cyclohexenyl)ethyl, 5-(bicycloheptenyl)ethyl, 2-cyclopentenyl, 3-cyclohexenyl, 5-norbornen-2-yl and 4-cyclooctenyl.

In the case where R$^0$ in formula (1-0) represents aryl, arbitrary hydrogen thereof may be replaced by halogen or alkyl having a carbon number of from 1 to 20. In the alkyl having a carbon number of from 1 to 20, arbitrary hydrogen may be replaced by fluorine, and arbitrary —CH$_2$— may be replaced by —O—, —CH=CH—, cycloalkylene or phenylene. Preferred examples of the aryl include phenyl, arbitrary hydrogen of which may be replaced by halogen or alkyl having a carbon number of from 1 to 8, and unsubstituted naphthyl. Preferred examples of the halogen include fluorine, chlorine and bromine. In the alkyl having a carbon number of from 1 to 8 as a substituent of the aryl, arbitrary hydrogen may be replaced by fluorine, and arbitrary —CH$_2$— may be replaced by —O—, —CH=CH—, cycloalkylene or phenylene. Specific preferred examples of the aryl include unsubstituted phenyl, unsubstituted naphthyl, alkylphenyl, alkyloxyphenyl, alkenylphenyl, phenyl having a substituent containing phenyl, and groups enumerated herein where arbitrary hydrogen is replaced by halogen.

Examples of the halogenated phenyl include pentafluorophenyl, 4-chlorophenyl and 4-bromophenyl. Examples of the alkylphenyl include 4-methylphenyl, 4-ethylphenyl, 4-propylphenyl, 4-butylphenyl, 4-pentylphenyl, 4-heptylphenyl, 4-octylphenyl, 4-nonylphenyl, 4-decylphenyl, 2,4- dimethylphenyl, 2,4,6-trimethylphenyl, 2,4,6-triethylphenyl, 4-(1-methylethyl)phenyl, 4-(1,1-dimethylethyl)phenyl, 4-(2-ethylhexyl)phenyl and 2,4,6-tris(1-methylethyl)phenyl. Examples of the alkyloxyphenyl include 4-methoxyphenyl, 4-ethoxyphenyl, 4-propoxyphenyl, 4-butoxyphenyl, 4-pentyloxyphenyl, 4-heptyloxyphenyl, 4-decyloxyphenyl, 4-octadecyloxyphenyl, 4-(1-methylethoxy)phenyl, 4-(2-methylpropoxy)phenyl and 4-(1,1-dimethylethoxy)phenyl. Examples of the alkenylphenyl include 4-vinylphenyl, 4-(1-methylvinyl)phenyl and 4-(3-butenyl)phenyl.

Examples of the phenyl having a substituent containing phenyl include 4-(2-phenylvinyl)phenyl, 4-phenyloxyphenyl, 3-phenylmethylphenyl, biphenyl and terphenyl. The 4-(2-phenylvinyl)phenyl is an example where in an ethyl group of ethylphenyl, one —CH$_2$— is replaced by phenylene, and another one —CH$_2$— is replaced by —CH=CH—.

Examples of the phenyl, in which a part of hydrogen of the benzene ring is replaced by halogen, and other hydrogen is replaced by alkyl, alkyloxy or alkenyl, include 3-chloro-4-methyl phenyl, 2,5-dichloro-4-methylphenyl, 3,5-dichloro-4-methylphenyl, 2,3,5-trichloro-4-methylphenyl, 2,3,6-trichloro-4-methylphenyl, 3-bromo-4-methylphenyl, 2,5-dibromo-4-methylphenyl, 3,5-dibromo-4-methylphenyl, 2,3-difluoro-4-methylphenyl, 3-chloro-4-methoxyphenyl, 3-bromo-4-methoxyphenyl, 3,5-dibromo-4-methoxyphenyl, 2,3-difluoro-4-methoxyphenyl, 2,3-difluoro-4-ethoxyphenyl, 2,3-difluoro-4-propoxyphenyl and 4-vinyl-2,3,5,6-tetrafluorophenyl.

In the case where R$^0$ in formula (1-0) represents arylalkyl, the arylalkyl is constituted by aryl, arbitrary hydrogen of which may be replaced by halogen or alkyl having a carbon number of from 1 to 20, and alkylene, arbitrary hydrogen of which may be replaced by fluorine, and arbitrary —CH$_2$— of which may be replaced by —O—, —CH=CH— or cycloalkylene. The alkyl having a carbon number of from 1 to 20 as a substituent of the aryl is alkyl, arbitrary hydrogen of which may be replaced by fluorine, and arbitrary —CH$_2$— of which may be replaced by —O—, —CH=CH—, cycloalkylene or phenylene.

Preferred examples of the arylalkyl include phenylalkyl constituted by phenyl and alkylene having a carbon number of from 1 to 8. In the phenyl, arbitrary hydrogen may be replaced by halogen or alkyl having a carbon number of from 1 to 8. In the alkyl having a carbon number of from 1 to 8, arbitrary —CH$_2$— may be replaced by —O—, —CH=CH—, cycloalkylene or phenylene. In the alkylene having a carbon number of from 1 to 8, arbitrary —CH$_2$— may be replaced by —O—, —CH=CH— or cycloalkylene.

Examples of the unsubstituted phenylalkyl include phenylmethyl, 2-phenylethyl, 3-phenylpropyl, 4-phenylbutyl, 5-phenylpentyl, 6-phenylhexyl, 11-phenylundecyl, 1-phenylethyl, 2-phenylpropyl, 1-methyl-2-phenylethyl, 1-phenylpropyl, 3-phenylbutyl, 1-methyl-3-phenylpropyl, 2-phenylbutyl, 2-methyl-2-phenylpropyl and 1-phenylhexyl.

Examples of the phenylalkyl where arbitrary hydrogen of the phenyl is replaced by fluorine include 4-fluorophenylmethyl, 2,3,4,5,6-pentafluorophenylmethyl, 2-(2,3,4,5,6-pentafluorophenyl)ethyl, 3-(2,3,4,5,6-pentafluorophenyl)propyl, 2-(2-fluorophenyl)propyl and 2-(4-fluorophenyl)propyl.

Examples of the phenylalkyl where arbitrary hydrogen of the phenyl is replaced by chlorine include 4-chlorophenylmethyl, 2-chlorophenylmethyl, 2,6-dichlorophenylmethyl, 2,4-dichlorophenylmethyl, 2,3,6-trichlorophenylmethyl, 2,4,6-triclorophenylmethyl, 2,4,5-trichlorophenylmethyl, 2,3,4,6-tetrachlorophenylmethyl, 2,3,4,5,6-pentachlorophenylmethyl, 2-(2-chlorophenyl)ethyl, 2-(4-chlorophenyl)ethyl, 2-(2,4,5-trichlorophenyl)ethyl, 2-(2,3,6-trichlorophenyl)ethyl, 3-(3-chlorophenyl)propyl, 3-(4-chlorophenyl)propyl, 3-(2,4,5-trichlorophenyl)propyl, 3-(2,3,6-trichlorophenyl)propyl, 4-(2-chlorophenyl)butyl, 4-(3-chlorophenyl)butyl, 4-(4-chlorophenyl)butyl, 4-(2,3,6-trichlorophenyl)butyl, 4-(2,4,5-trichlorophenyl)butyl, 1-(3-chlorophenyl)ethyl, 1-(4-chlorophenyl)ethyl, 2-(4-chlorophenyl)propyl, 2-(2-chlorophenyl)propyl and 1-(4-chlorophenyl)butyl.

Examples of the phenylalkyl where arbitrary hydrogen of the phenyl is replaced by bromine include 2-bromophenylmethyl, 4-bromophenylmethyl, 2,4-dibromophenylmethyl, 2,4,6-tribromophenylmethyl, 2,3,4,5-tetrabromophenylmethyl, 2,3,4,5,6-pentabromophenylmethyl, 2-(4-bromophenyl)ethyl, 3-(4-bromophenyl)propyl, 3-(3-bromophenyl)propyl, 4-(4-bromophenyl)butyl, 1-(4-bromophenyl)ethyl, 2-(2-bromophenyl)propyl and 2-(4-bromophenyl)propyl.

Examples of the phenylalkyl where arbitrary hydrogen of the phenyl is replaced by alkyl having a carbon number of from 1 to 8 include 2-methylphenylmethyl, 3-methylphenylmethyl, 4-methylphenylmethyl, 4-dodecylphenylmethyl, 3,5-dimethylphenylmethyl, 2-(4-methylphenyl)ethyl, 2-(3-methylphenyl)ethyl, 2-(2,5-dimethylphenyl)ethyl, 2-(4-ethylphenyl)ethyl, 2-(3-ethylphenyl)ethyl, 1-(4-methylphenyl)ethyl, 1-(3-methylphenyl)ethyl, 1-(2-methylphenyl)ethyl, 2-(4-methylphenyl)propyl, 2-(2-methylphenyl)propyl, 2-(4-ethylphenyl)propyl, 2-(2-ethylphenyl)propyl, 2-(2,3-dimethylphenyl)propyl, 2-(2,5-dimethylphenyl)propyl, 2-(3,5-dimethylphenyl)propyl, 2-(2,4-dimethylphenyl)propyl, 2-(3,4-dimethylphenyl)propyl, 2-(2,5-dimethylphenyl)butyl, 4-(1-methylethyl)phenylmethyl, 2-(4-(1,1-dimethylethyl)phenyl)ethyl, 2-(4-(1-methylethyl)phenyl)propyl and 2-(3-(1-methylethyl)phenyl)propyl.

Examples of the phenylalkyl where arbitrary hydrogen of the phenyl is replaced by fluorinated alkyl having a carbon number of from 1 to 8 include 3-trifluoromethylphenylmethyl, 2-(4-trifluoromethylphenyl)ethyl, 2-(4-nonafluorobutylphenyl) ethyl, 2-(4-tridecafluorohexylphenyl)ethyl, 2-(4-heptadecafluorooctylphenyl)ethyl, 1-(3-trifluoromethylphenyl)ethyl, 1-(4-trifluoromethylphenyl)ethyl, 1-(4-nonafluorobutylphenyl)ethyl, 1-(4-tridecafluorohexylphenyl)ethyl, 1-(4-heptadecafluorooctylphenyl)ethyl, 2-(4-nonafluorobutylphenyl)propyl, 1-methyl-1-(4-nonafluorobutylphenyl)ethyl, 2-(4-tridecafluorohexylphenyl)propyl, 1-methyl-1-(4-tridecafluorohexylphenyl)ethyl, 2-(4-heptadecafluorooctylphenyl)propyl and 1-methyl-1-(4-heptadecafluorooctylphenyl)ethyl.

Examples of the phenylalkyl where arbitrary hydrogen of the phenyl is replaced by alkyl having a carbon number of from 1 to 8 in the case where —CH$_2$— in the alkyl is replaced by —CH=CH— include 2-(4-vinylphenyl)ethyl, 1-(4-vinylphenyl)ethyl and 1-(2-(2-propenyl)phenyl)ethyl.

Examples of the phenylalkyl where arbitrary hydrogen of the phenyl is replaced by alkyl having a carbon number of from 1 to 8 in the case where —CH$_2$— in the alkyl is replaced by —O— include 4-methoxyphenylmethyl, 3-methoxyphenylmethyl, 4-ethoxyphenylmethyl, 2-(4-methoxyphenyl)ethyl, 3-(4-methoxyphenyl)propyl, 3-(2-methoxyphenyl)propyl, 3-(3,4-dimethoxyphenyl)propyl, 1-(4-methoxyphenyl)ethyl, (3-methoxymethylphenyl)ethyl and 3-(2-nonadecafluorodecenyloxyphenyl)propyl.

Examples of the phenylalkyl where arbitrary hydrogen of the phenyl is replaced by alkyl having a carbon number of from 1 to 8 in the case where one —CH$_2$— in the alkyl is replaced by cycloalkylene include, which also include the case where another one —CH$_2$— is replaced by —O—, cyclopentylphenylmethyl, cyclopentyloxyphenylmethyl, cyclohexylphenylmethyl, cyclohexylphenylethyl, cyclohexylphenylpropyl and cyclohexyloxyphenylmethyl.

Examples of the phenylalkyl where arbitrary hydrogen of the phenyl is replaced by alkyl having a carbon number of from 1 to 8 in the case where one —CH$_2$— in the alkyl is replaced by phenylene include, which also include the case where another one —CH$_2$— is replaced by —O—, 2-(4-phenoxyphenyl)ethyl, 2-(4-phenoxyphenyl)propyl, 2-(2-phenoxyphenyl)propyl, 4-biphenylylmethyl, 3-biphenylylethyl, 4-biphenylylethyl, 4-biphenylylpropyl, 2-(2-biphenylyl)propyl and 2-(4-biphenylyl)propyl.

Examples of the phenylalkyl where at least two hydrogens of the phenyl are replaced by different groups include 3-(2,5-dimethoxy-3,4,6-trimethylphenyl)propyl, 3-chloro-2-methylphenylmethyl, 4-chloro-2-methylphenylmethyl, 5-chloro-2-methylphenylmethyl, 6-chloro-2-methylphenylmethyl, 2-chloro-4-methylphenylmethyl, 3-chloro-4-methylphenylmethyl, 2,3-dichloro-4-methylphenylmethyl, 2,5-dichloro-4-methylphenylmethyl, 3,5-dichloro-4-methylphenylmethyl, 2,3,5-trichloro-4-methylphenylmethyl, 2,3,5,6-tretrachloro-4-methylphenylmethyl, 2,3,4,6-tretrachloro-5-methylphenylmethyl, 2,3,4,5-tretrachloro-6-methylphenylmethyl, 4-chloro-3,5-dimethylphenylmethyl, 2-chloro-3,5-dimethylphenylmethyl, 2,4-dichloro-3,5-dimethylphenylmethyl, 2,6-dichloro-3,5-dimethylphenylmethyl, 2,4,6-trichloro-3,5-dimethylphenylmethyl, 3-boromo-2-methylphenylmethyl, 4-bromo-2-methylphenylmethyl, 5-bromo-2-methylphenylmethyl, 6-bromo-2-methylphenylmethyl, 3-bromo-4-methylphenylmethyl, 2,3-dibromo-4-methylphenylmethyl, 2,3,5-tribromo-4-methylphenylmethyl and 2,3,5,6-tetrabromo-4-methylphenylmethyl.

More preferred examples of the phenyl constituting the phenylalkyl include unsubstituted phenyl and phenyl having at least one of fluorine, alkyl having a carbon number of from 1 to 4, vinyl and methoxy as a substituent. In some cases, phenylalkyl having vinyl as a substituent is not preferred as described later.

Examples of the phenylalkyl where —CH$_2$— of the alkylene is replaced by —O—, —CH═CH— or cycloalkylene include 3-phenoxypropyl, 1-phenylvinyl, 2-phenylvinyl, 3-phenyl-2-propenyl, 4-phenyl-4-pentenyl, 13-phenyl-12-tridecenyl, phenylcyclohexyl and phenoxycyclohexyl.

Examples of the phenylalkenyl where arbitrary hydrogen of the phenyl is replaced by fluorine or methyl include 4-fluorophenylvinyl, 2,3-difluorophenylvinyl, 2,3,4,5,6-pentafluorophenylvinyl and 4-methylphenylvinyl.

More preferred examples of R$^0$ include unsubstituted phenyl, halogenated phenyl, phenyl having at least one methyl, methoxyphenyl, naphthyl, phenylmethyl, phenylethyl, phenylbutyl, 2-phenylpropyl, 1-methyl-2-phenylethyl, pentafluorophenylpropyl, 4-ethylphenylethyl, 3-ethylphenylethyl, 4-(1,1-dimethylethyl)phenylethyl, 4-vinylphenylethyl, 1-(4-vinylphenyl)ethyl, 4-methoxyphenylpropyl, phenoxypropyl, cyclopentyl and cyclohexyl. Further preferred examples of R$^0$ include unsubstituted phenyl, cyclopentyl and cyclohexyl.

In formula (1-0), Y represents a group represented by formula (a) or formula (b).

(a)

(b)

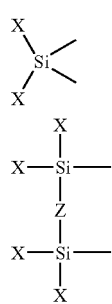

In each of formula (a) and formula (b), X each independently represents hydrogen, chlorine, a group defined as similar to R$^0$, or a group having one of —CH═CH—, —C≡C—, —OH, —COOH, —COO—, 2-oxapropane-1,3-dioyl, oxiranyl, oxiranylene, oxetanyl, oxetanylene, 3,4-epoxycyclohexyl, —SH, —NH—, —NH$_2$, —CN and —O—. At least one of X is a reactive group selected from the aforementioned groups. In other words, at least one of X represents hydrogen, chlorine or a group having one of —CH═CH—, —C≡C—, —OH, —COOH, —COO—, 2-oxapropane-1,3-dioyl, oxiranyl, oxiranylene, oxetanyl, oxetanylene, 3,4-epoxycyclohexyl, —SH, —NH— and —NH$_2$. These are preferred for forming the polymer.

Examples of X other than the reactive groups include a group defined as similar to R$^0$ and a group having —CN or —O—. Preferred examples of X other than the reactive groups include a group defined as similar to R$^0$. The compound (1-0) where X represents chlorine may be utilized for forming the polymer, and may be utilized for graft modification or the like after forming the polymer.

In formula (b), Z represents a single bond, —O— or —CH$_2$—, and preferred examples of Z include —O—.

The polymer of the invention is preferably obtained by reacting a compound having at least two groups capable of reacting with the reactive group in the compound (1-0) with the compound (1-0). Such a compound is preferred that is obtained by using the compound (1-0) having at least two alkenyls or the compound (1-0) having at least two Si—H groups.

The compound (1-0) having at least two alkenyls is represented by formula (1-1).

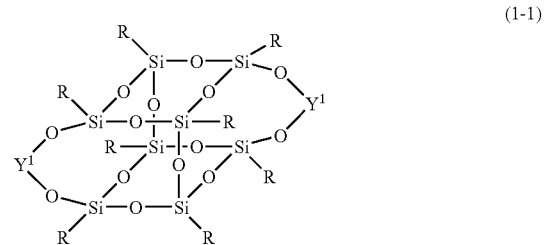

(1-1)

In formula (1-1), R is a group defined as similar to R$^0$ in formula (1-0), and preferred groups thereof are the same as in R$^0$. However, it is not preferred that R represents hydrogen or alkenyl. In formula (1-1), Y$^1$ each represents a group represented by formula (a-1) or formula (b-1).

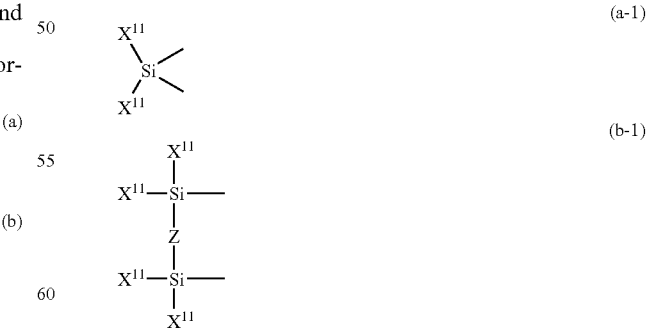

(a-1)

(b-1)

In each of formula (a-1) and formula (b-1), at least one of X$^{11}$ represents alkenyl. The balance of X$^{11}$ each independently represents chlorine, a group defined as similar to R, or a group having one of —OH, —COOH, —COO—, 2-oxapropane-1, 3-dioyl, oxiranyl, oxiranylene, oxetanyl, oxetanylene, 3,4-epoxycyclohexyl, —SH, —NH—, —NH$_2$, —CN and —O—. Preferred examples of $X^{11}$ other than alkenyl include chlorine and a group defined as similar to R, and more preferably a group defined as similar to R. Preferred groups of the group defined as similar to R include alkyl having a carbon number of from 1 to 8, unsubstituted phenyl, cyclopentyl and cyclohexyl, and more preferably alkyl having a carbon number of from 1 to 4 and unsubstituted phenyl. The alkyl having a carbon number of from 1 to 4 is most preferably methyl. In formula (b-1), Z represents a single bond, —O— or —CH$_2$—, and more preferably —O—. In order to exert the advantage of the invention sufficiently, it is preferred in each of formula (a-1) and formula (b-1) that only one of $X^{11}$ represents alkenyl. In other words, the compound (1-1) that has two alkenyls is preferred.

The group having one of —OH, —COOH, —COO—, 2-oxapropane-1,3-dioyl, oxiranyl, oxiranylene, oxetanyl, oxetanylene, 3,4-epoxycyclohexyl, —SH, —NH—, —NH$_2$, —CN and —O— may be either an aliphatic group, a group having an aromatic ring, a group having an aliphatic ring or a group having a silicon atom. However, such a group is not included that has one of these groups and alkenyl or Si—H simultaneously.

Examples of the alkenyl include alkenyl, alkenyloxyalkyl, alkenylphenyl, alkenyloxyphenyl, alkenylphenylalkyl, alkenyloxyphenylalkyl, alkenylcycloalkyl and alkenyloxycycloalkyl. Preferred examples among these include alkenyl having a carbon number of from 2 to 4, styryl, vinyloxyphenyl and allyloxyphenyl. More preferred examples thereof include vinyl, allyl and styryl, and further preferred examples thereof include vinyl.

Upon using the compound (1-1), a compound having at least two Si—H groups can be selected as a counterpart of the reaction, whereby a polymer can be obtained by utilizing a hydrosilylation reaction. In order to obtain a polymer having a linear chemical structure without branch, it is preferred to select a compound having two Si—H groups as a counterpart of the reaction with the compound (1-1). Such a compound can be selected from silsesquioxane derivatives or compounds having siloxane, whereby a polymer excellent in heat resistance, weather resistance and the like can be obtained. Preferred examples of the compound as a counterpart of the reaction with the compound (1-1) include a compound (1-2), a compound (2-1), a compound (3-1), a compound (4-1), a compound (5-1) and a compound (6-1).

The compound (1-2) is a compound where the compound (1-0) has Si—H groups.

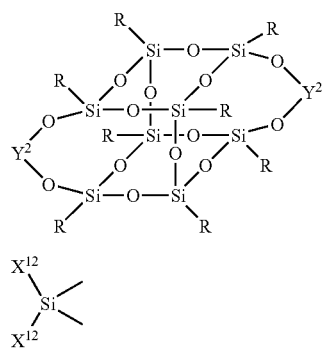

(1-2)

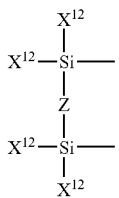

(a-2)

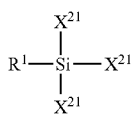

(b-2)

In formula (1-2), R represents a group defined as similar to R in formula (1-1), and preferred examples thereof are the same. $Y^2$ each represents a group represented by formula (a-2) or formula (b-2). In each of formula (a-2) and formula (b-2), at least one of $X^{12}$ represents hydrogen, and the balance of $X^{12}$ each independently represents chlorine, a group defined as similar to R, or a group having one of —OH, —COOH, —COO—, 2-oxapropane-1,3-dioyl, oxiranyl, oxiranylene, oxetanyl, oxetanylene, 3,4-epoxycyclohexyl, —SH, —NH—, —NH$_2$, —CN and —O—. Preferred examples of $X^{12}$ other than hydrogen include chlorine and a group defined as similar to R, and more preferably a group defined as similar to R. Preferred examples of the group defined as similar to R include alkyl having a carbon number of from 1 to 8, unsubstituted phenyl, cyclopentyl and cyclohexyl, and more preferably alkyl having a carbon number of from 1 to 4 and unsubstituted phenyl. The alkyl having a carbon number of from 1 to 4 is most preferably methyl. In formula (b-2), Z represents a single bond, —O— or —CH$_2$—. Preferred examples of Z include —O—. In order to exert the advantage of the invention sufficiently, it is preferred in each of formula (a-2) and formula (b-2) that only one of $X^{12}$ represents hydrogen. In other words, the compound (1-2) that has two Si—H groups is preferred.

The compound (2-1) is a hydrosilane derivative.

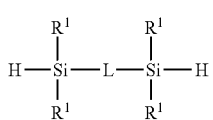

(2-1)

In formula (2-1), $R^1$ represents a group defined as similar to R in formula (1-1), and preferred examples thereof are the same. More preferred examples of $R^1$ include alkyl having a carbon number of from 1 to 8, unsubstituted phenyl, cyclopentyl and cyclohexyl, and further preferred examples thereof include alkyl having a carbon number of from 1 to 4 and unsubstituted phenyl. The alkyl having a carbon number of from 1 to 4 is most preferably methyl. At least two of $X^{21}$ each represents hydrogen, and it is preferred that only two thereof are hydrogens. In this case, the balance of $X^{21}$ represents $R^1$.

The compound (3-1) is a silicon compound having a structure bonded in a linear form.

$$\begin{array}{c} R^1 \quad\quad R^1 \\ | \quad\quad\quad | \\ H\text{—}Si\text{—}L\text{—}Si\text{—}H \\ | \quad\quad\quad | \\ R^1 \quad\quad R^1 \end{array} \quad (3\text{-}1)$$

In formula (3-1), $R^1$ each represents a group defined as similar to R in formula (1-1), and preferred examples thereof are the same. More preferred examples of $R^1$ include alkyl having a carbon number of from 1 to 8, unsubstituted phenyl, cyclopentyl and cyclohexyl, and further preferred examples thereof include alkyl having a carbon number of from 1 to 4 and unsubstituted phenyl. The alkyl having a carbon number of from 1 to 4 is most preferably methyl. L represents a single bond, —O—, —$CH_2$—, —$(CH_2)_2$—, —$(CH_2)_3$—, —$(CH_2)_4$—, 1,4-phenylene, 4,4'-diphenylene, 4,4'-oxy-1,1'-diphenylene or a group represented by formula (c).

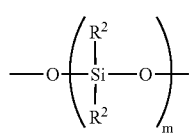

(c)

wherein $R^2$ each represents a group defined as similar to $R^1$, and m represents an integer of from 1 to 30.

Formula (3-1) can be expanded as follows.

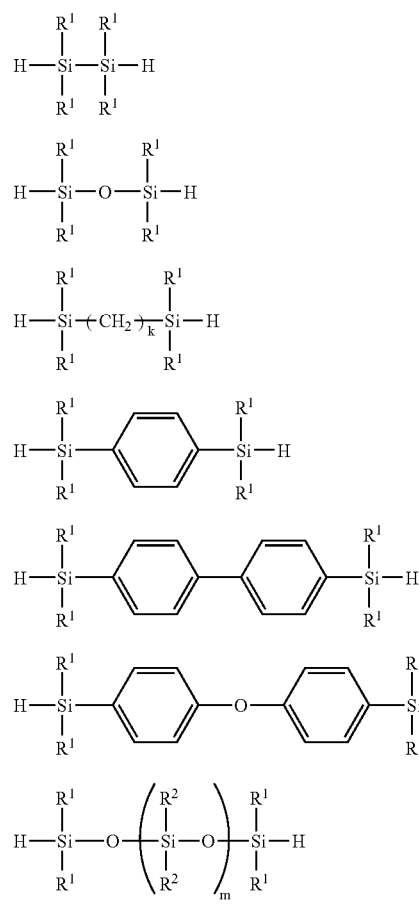

In formulae (3-1-1) to (3-1-7), $R^1$ has the same meaning as $R^1$ in formula (3-1), and preferred examples thereof are the same. k represents an integer of from 1 to 4, $R^2$ represents a group defined as similar to $R^1$, and m represents an integer of from 1 to 30. Among the compounds (3-1-1) to (3-1-7), the compound (3-1-7) is preferred. By using the compound as a counterpart of the compound (1-1), a polymer having a flexible molecular structure can be obtained.

The compound (4-1) is a PSQ derivative having a cage structure.

(4-1)

In formula (4-1), $R^2$ each represents a group defined as similar to $R^1$ in formula (2-1). At least two of $X^{21}$ each represents hydrogen, and it is preferred that only two thereof are hydrogens. It is more preferred that these are at separate positions. The balance of $X^{21}$ each represents a group defined as similar to R in formula (1-1), and preferred examples thereof are the same. e represents 0 or 1. n represents an integer of from 3 to 30. n preferably represents from 4 to 6.

The compound (5-1) is a silicon compound having a structure of the cage structure of silsesquioxane with one broken corner.

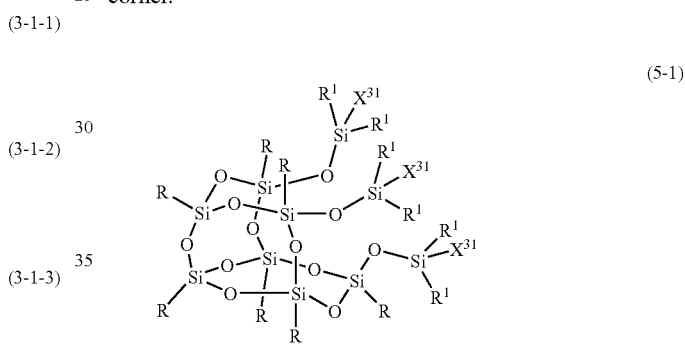

(5-1)

In formula (5-1), R and $R^1$ each represents a group defined as similar to R in formula (1-1). At least two of $X^{31}$ each represents hydrogen, and the balance of $X^{31}$ each represents $R^1$. Preferred examples of $R^1$ are the same as in $R^1$ in formula (2-1).

The compound (6-1) is a silicon compound having a structure of the cage structure of silsesquioxane with two broken corners.

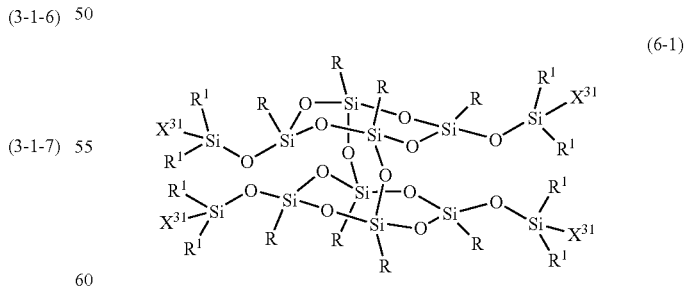

(6-1)

In formula (6-1), R and $R^1$ each represents a group defined as similar to R in formula (1-1). At least two of $X^{31}$ each represents hydrogen, and the balance of $X^{31}$ each represents a group defined as similar to $R^1$. Preferred examples of R are the same as in R in formula (1-1). Preferred examples of $R^1$ are the same as in $R^1$ in formula (2-1).

The case of using the compound (1-0) having at least two Si—H will be then described. The compound (1-0) of this kind is a compound (1-2).

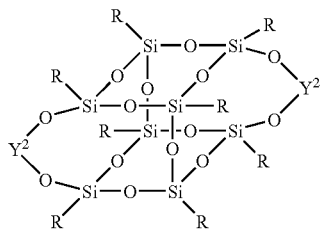
(1-2)

In formula (1-2), R represents a group defined as similar to $R^0$ in formula (1-0), and preferred examples thereof are the same. However, it is not preferred that R represents hydrogen or alkenyl.

In formula (1-2), $Y^2$ represents a group represented by formula (a-2) or formula (b-2).

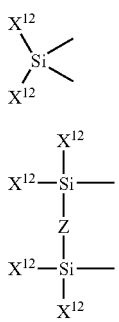

In each of formula (a-2) and formula (b-2), at least one of $X^{12}$ represents hydrogen. The balance of $X^{12}$ each independently represents chlorine, a group defined as similar to R, or a group having one of —OH, —COOH, —COO—, 2-oxapropane-1,3-dioyl, oxiranyl, oxiranylene, oxetanyl, oxetanylene, 3,4-epoxycyclohexyl, —SH, —NH—, —NH$_2$, —CN and —O—. Preferred examples of $X^{12}$ other than hydrogen include chlorine and a group defined as similar to R, and more preferably a group defined as similar to R. Preferred examples of the group defined as similar to R include alkyl having a carbon number of from 1 to 8, unsubstituted phenyl, cyclopentyl and cyclohexyl, and more preferably alkyl having a carbon number of from 1 to 4 and unsubstituted phenyl. The alkyl having a carbon number of from 1 to 4 is most preferably methyl. In formula (b-2), Z represents a single bond, —O— or —CH$_2$—. Preferred examples of Z include —O—. In order to exert the advantage of the invention sufficiently, it is preferred in each of formula (a-2) and formula (b-2) that only one of $X^{12}$ represents hydrogen.

The group having one of —OH, —COOH, —COO—, 2-oxapropane-1,3-dioyl, oxiranyl, oxiranylene, oxetanyl, oxetanylene, 3,4-epoxycyclohexyl, —SH, —NH—, —NH$_2$, —CN and —O— may be either an aliphatic group, a group having an aromatic ring, a group having an aliphatic ring or a group having a silicon atom. However, such a group is not included that has one of these groups and alkenyl or Si—H simultaneously.

Upon using the compound (1-2), a compound having at least two alkenyls or a compound having a carbon-carbon triple bond can be selected as a counterpart of the reaction, whereby a polymer can be obtained by utilizing a hydrosilylation reaction. In order to obtain a polymer having a linear chemical structure without branch, it is preferred to select a compound having two alkenyls or a compound having one or two carbon-carbon triple bonds as a counterpart of the reaction with the compound (1-2). Silsesquioxane derivatives or compounds having siloxane can be selected as such compounds, whereby a polymer excellent in heat resistance, weather resistance and the like can be obtained. Examples of the alkenyl and preferred examples thereof are those having been described. Preferred examples of the compound as a counterpart of the reaction with the compound (1-2) include a compound (2-2), a compound (3-2), a compound (4-2), a compound (5-2), a compound (6-2) and compound (d-1) to compound (d-4).

The compound (2-2) is a hydrosilane derivative.

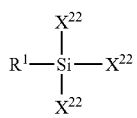
(2-2)

In formula (2-2), $R^1$ represents a group defined as similar to R in formula (1-2), and preferred examples thereof are the same. More preferred examples of $R^1$ include alkyl having a carbon number of from 1 to 8, unsubstituted phenyl, cyclopentyl and cyclohexyl. Further preferred examples of $R^1$ include alkyl having a carbon number of from 1 to 4 and unsubstituted phenyl. The alkyl having a carbon number of from 1 to 4 is most preferably methyl. At least two of $X^{22}$ each represents alkenyl or a group having a carbon-carbon triple bond, and it is preferred that only two thereof are alkenyl or a carbon-carbon triple bond-containing group. In this case, the balance of $X^{22}$ represents $R_1$. The following compound is an example of the compound having a carbon-carbon triple bond. In the case where $X^{22}$ represents alkenyl, examples of the compound and preferred examples thereof are those having been described.

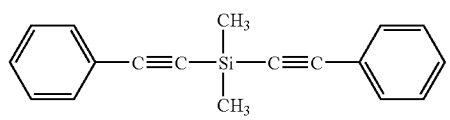

The compound (3-2) is a silicon compound having a structure bonded in a linear form.

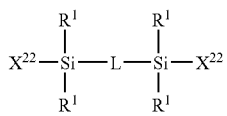
(3-2)

In formula (3-2), $R^1$ each represents a group defined as similar to R in formula (1-2), and preferred examples thereof are the same. More preferred examples of $R^1$ include alkyl having a carbon number of from 1 to 8, unsubstituted phenyl, cyclopentyl and cyclohexyl. Further preferred examples of $R^1$ include alkyl having a carbon number of from 1 to 4 and unsubstituted phenyl. The alkyl having a carbon number of from 1 to 4 is most preferably methyl. L represents a single bond, —O—, —CH$_2$—, —(CH$_2$)$_2$—, —(CH$_2$)$_3$—, —(CH$_2$)$_4$—, 1,4-phenylene, 4,4'-diphenylene, 4,4'-oxy-1,1'-diphenylene or a group represented by formula (c).

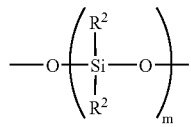
(c)

wherein R each represents a group defined as similar to R$^1$, and m represents an integer of from 1 to 30.

Formula (3-2) can be expanded as follows.

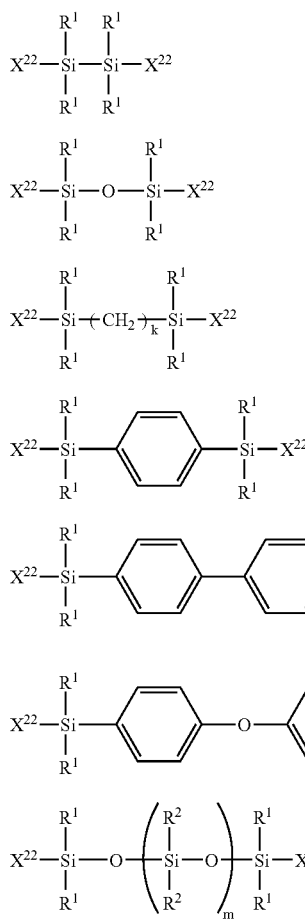

In formulae (3-2-1) to (3-2-7), R$^1$ has the same meaning as R$^1$ in formula (3-2), and preferred examples thereof are the same. k represents an integer of from 1 to 4, R$^2$ represents a group defined as similar to R$^1$, and m represents an integer of from 1 to 30. X$^{22}$ represents alkenyl or a group having a carbon-carbon triple bond. In the case where X$^{22}$ represents alkenyl, examples and preferred examples thereof are those having been described. Among the compounds (3-2-1) to (3-2-7), the compound (3-2-7) is preferred. By using the compound as a counterpart of the compound (1-2), a polymer having a flexible molecular structure can be obtained.

The compound (4-2) is a PSQ derivative having a cage structure.

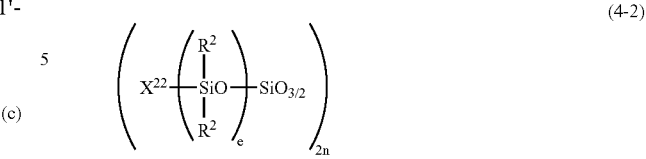
(4-2)

In formula (4-2), R$^2$ each represents a group defined as similar to R$^1$ in formula (2-2). At least two of X$^{22}$ each represents alkenyl or a group having a carbon-carbon triple bond, and it is preferred that only two thereof are alkenyls. It is more preferred that the two alkenyls are at separate positions. Examples and preferred examples of the alkenyl are those having been described. The balance of X$^{22}$ each represents a group defined as similar to R in formula (1-2), and preferred examples thereof are the same. e represents 0 or 1. n represents an integer of from 3 to 30. n preferably represents from 4 to 6.

The compound (5-2) is a silicon compound having a structure of the cage structure of silsesquioxane with one broken corner.

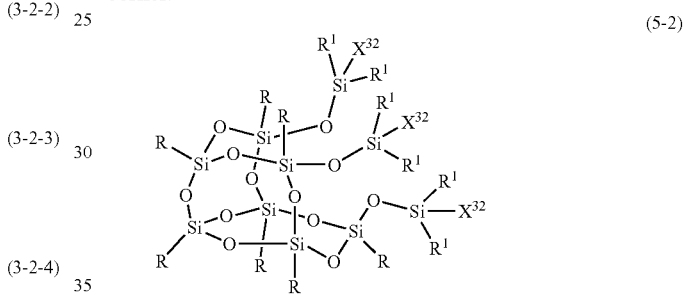
(5-2)

In formula (5-2), R and R$^1$ each represents a group defined as similar to R in formula (1-2). At least two of X$^{32}$ each represents alkenyl or a group having a carbon-carbon triple bond, and the balance of X$^{32}$ each represents a group defined as similar to R$^1$. In the case where X$^{32}$ represents alkenyl, examples and preferred examples thereof are those having been described. Preferred examples of R are the same as in R in formula (1-2). Preferred examples of R$^1$ are the same as in R$^1$ in formula (2-2).

The compound (6-2) is a silicon compound having a structure of the cage structure of silsesquioxane with two broken corners.

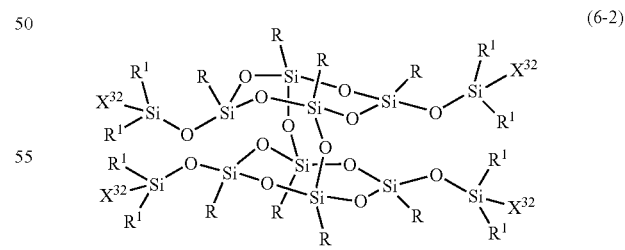
(6-2)

In formula (6-2), R and R$^1$ each represents a group defined as similar to R in formula (1-2). At least two of X$^{32}$ each represents alkenyl or a carbon-carbon triple bond, and the balance X$^{32}$ each represents R$^1$. In the case where X$^{32}$ represents alkenyl, examples and preferred examples thereof are those having been described. Preferred example of R are the same as in R in formula (1-2). Preferred examples of R$^1$ are the same as in R$^1$ in formula (2-2).

The compound (d-1) to compound (d-4) are examples of the compound having alkenyl or a carbon-carbon triple bond other than the aforementioned silicon compounds.

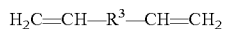  (d-1)

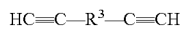  (d-2)

  (d-3)

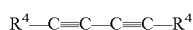  (d-4)

In each of formula (d-1) to formula (d-4), $R^3$ each represents alkylene having a carbon number of from 1 to 40 or phenylene, arbitrary hydrogen of which may be replaced by halogen or alkyl having a carbon number of from 1 to 4; $R^4$ each represents alkyl having a carbon number of from 1 to 8 or phenyl, arbitrary hydrogen of which may be replaced by halogen or alkyl having a carbon number of from 1 to 4; and in each of the alkylene having a carbon number of from 1 to 40 and the alkyl having a carbon number of from 1 to 8, arbitrary —CH$_2$— may be replaced by —O— or —COO—.

Examples of these compounds are shown below. In the following formulae, k1 represents an integer of from 1 to 12.

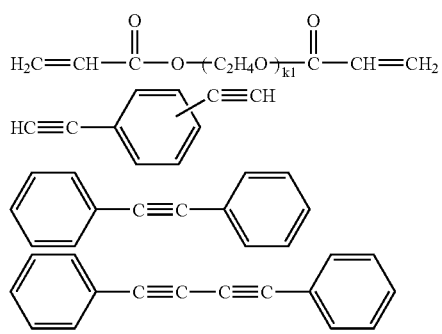

The compound having alkenyl or a carbon-carbon triple bond other than the silicon compounds are not limited to the compound (d-1) to compound (d-4). For example, the following compound may be used.

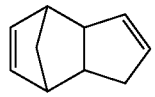

The compound (1-0) used in the invention can be easily obtained, for example, by reacting a compound (1-M) with a compound (J).

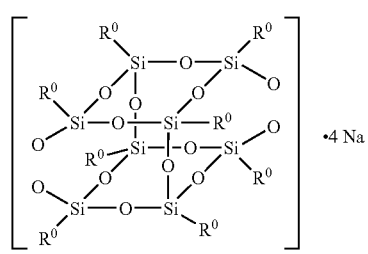  (1-M)

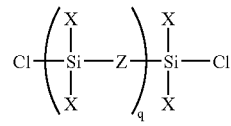  (J)

In these formulae, $R^0$ has the same meaning as $R^0$ in formula (1-0), X and Z have the same meanings as these symbols in formula (b), respectively, and q is 0 or 1.

The compound (1-M) can be obtained by condensing a compound (F) through hydrolysis in the presence of sodium hydroxide, water and an organic solvent.

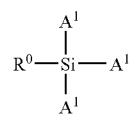  (F)

In the formula, $R^0$ has the same meaning as $R^0$ in formula (1-0), and $A^1$ represents a hydrolyzable group. Preferred examples of $A^1$ include chlorine and alkoxy having a carbon number of from 1 to 4. The using amount of sodium hydroxide is preferably from 0.4 to 0.8 in terms of molar ratio to the compound (F). The amount of water to be added is preferably from 1.1 to 1.3 in terms of molar ratio to the compound (F). Preferred examples of the organic solvent include a linear, branched or cyclic monovalent alcohol.

The compound (5-1) and the compound (5-2) can be easily obtained, for example, by reacting a compound (5-M) with a compound (G1) and a compound (G2), respectively.

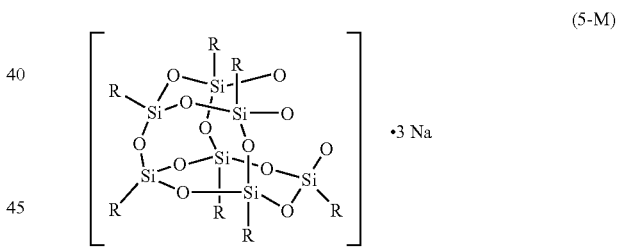  (5-M)

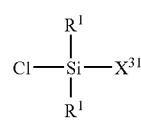  (G1)

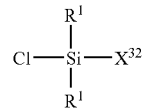  (G2)

In these formulae, the symbols have the same meanings as the symbols in formulae (5-1) and (5-2). The compound (5-M) can be obtained, for example, by condensing a compound (H) through hydrolysis in the presence of sodium hydroxide, water and an organic solvent having oxygen in formula.

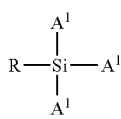

(H)

In the formula, R has the same meaning as R in formula (5-1), and $A^1$ has the same meaning as $A^1$ in formula (F). The using amount of sodium hydroxide is preferably from 0.2 to 1 in terms of molar ratio to the compound (H). The amount of water to be added is preferably from 1 to 3 in terms of molar ratio to the compound (H). Preferred examples of the organic solvent include a linear, branched or cyclic monovalent alcohol and a linear or cyclic ether.

The production conditions of the compound (1-M) are included in the range of the production conditions of the compound (5-M). That is, in the production conditions of the compound (5-M), there are conditions where only the compound (5-M) can be obtained, and conditions where both the compound (1-M) and the compound (5-M) can be obtained. Only the compound (1-M) can be obtained by optimizing the using ratio of the compound (F), sodium hydroxide and water.

The compound (6-1) and the compound (6-2) can be easily obtained by reacting the compound (1-M) with the compound (G1) and the compound (G2), respectively. A part of the compounds used in the invention can also be available from Hybrid Plastics, Inc. other than the compound (1-0), the compound (6-1) and the compound (6-2).

The solvent used in the hydrosilylation reaction is not particularly limited as far as it does not impair the progress of the reaction. Preferred examples of the solvent include an aliphatic hydrocarbon (such as hexane and heptane), an aromatic hydrocarbon (such as benzene, toluene and xylene), an ether (such as diethyl ether, tetrahydrofuran (THF) and dioxane), a halogenated hydrocarbon (such as methylene chloride and carbon tetrachloride), and an ester (such as ethyl acetate). These solvents may be used solely or in combination of plural kinds thereof. Among these solvents, an aromatic hydrocarbon is preferred. Toluene is more preferred as the aromatic hydrocarbon. In the case where the solvent is used, the ratio of the compound of the invention with respect to the solvent is preferably from 0.05 to 80% by weight based on the weight of the solvent. The ratio is more preferably from 30 to 70% by weight. The ratio varies depending on purposes. The solvent is not always necessary.

The hydrosilylation polymerization may be carried out at room temperature. The system may be heated to accelerate the polymerization. The system may be cooled to control heating of the polymerization or to control unfavorable polymerization and the like purposes. A catalyst may be used in the hydrosilylation polymerization depending on necessity. The polymerization can be easily effected by adding a hydrosilylation catalyst. Preferred examples of the hydrosilylation catalyst include a Karstedt catalyst, a Speier catalyst and hexachloroplatinic acid, and these are catalysts that are ordinarily well known in the art. The hydrosilylation catalyst may be added in a small amount for effecting the reaction owing to the high reactivity thereof. The using amount thereof is from $10^{-9}$ to 1% by mole in terms of a ratio of a transition metal contained in the catalyst with respect to the hydrosilyl groups. The addition ratio is preferably from $10^{-7}$ to $10^{-3}$% by mole. The value $10^{-9}$ by mole is the lower limit where the polymerization can proceed to complete the reaction within an acceptable period of time. The ratio is preferably 1% by mole or less in consideration of reduction of the production cost.

The polymer obtained by introducing a skeleton of a cage structure into a main chain has high rigidity owing to restriction in movement of the main chain, and thus it is expected to have high heat resistance and high physical strength. In order to enhance the advantage, it is preferred to use a compound having a cage structure as the counterpart of the compound (1-0). One example of the preferred combination is a combination of at least one of the compound (1-2), the compound (4-1), the compound (5-1) and the compound (6-1) with the compound (1-1). Another example of the preferred combination is a combination of at least one of the compound (4-2), the compound (5-2) and the compound (6-2) with the compound (1-2). One example of the more preferred combination is a combination of at least one of the compound (1-2), the compound (5-1) and the compound (6-1) with the compound (1-1). Another example of the more preferred combination is a combination of at least one of the compound (5-2) and the compound (6-2) with the compound (1-2). A combination of the compound (1-1) and the compound (1-2) is the most preferred. The polymer can be controlled in flexibility, transparency, dielectric constant, refractive index and the like depending on necessity by adjusting the properties of the reaction component (such as the length, the hardness and the constitutional atoms of the molecular chain) and the reaction conditions. Specifically, the flexibility of the polymer can be adjusted by using the compound (3-1), the compound (3-2), the compound (d-1) or the compound (d-2) in combination. One example of the case where the compound (3-1), the compound (3-2), the compound (d-1) or the compound (d-2) is used is that a combination of at least one of the compound (1-2), the compound (5-1) and the compound (6-1) with the compound (1-1) is further combined with the compound (3-1). Another example thereof is that a combination of at least one of the compound (5-2) and the compound (6-2) with the compound (1-2) is further combined with the compound (3-2), the compound (d-1) or the compound (d-2). Furthermore, a combination of the compound (1-1) with the compound (3-1) may be used, and a combination of the compound (1-2), the compound (3-2), and the compound (d-1) or the compound (d-2) may be used.

The polymer obtained by introducing a skeleton of a cage structure into a main chain is excellent in solubility, heat resistance, mechanical strength, optical transmissibility, gas transmissibility, dielectric constant, flame retardancy, adhesion property, processability and the like. As a result, it can be applied to a wide range of purposes. For example, it can be used as an electric and electronic material, a coating agent for a substrate, such as a film for preventing elution of metallic ions, a gas barrier film and an antireflection film, a coating agent for a semiconductor, such as a liquid sealant and an interlayer dielectric film, an optical device, such as a microlens, an optical waveguide plate and an optical waveguide material, a display substrate, and a printed-circuit board. Depending on necessity, other components, such as an antioxidant, a colorant and a filler, may be mixed with the polymer in such a range that does not impair the intended properties.

In the case where the hydrosilylation reaction is not utilized, the polymer can be obtained by using the PSQ derivative represented by formula (1-4).

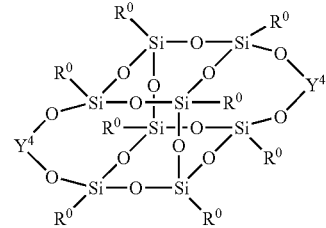

(1-4)

In formula (1-4), $R^0$ represents a group defined as similar to $R^0$ in formula (1-0), and preferred examples are the same.

In formula (1-4), $Y^4$ represents a group represented by formula (a-4) or formula (b-4).

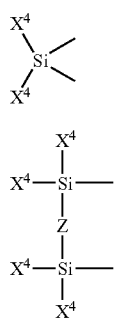

In each of formula (a-4) and formula (b-4), $X^4$ each independently represents chlorine, a group defined as similar to $R^0$, or a group having one of —CH=CH—, —C≡C—, —OH, —COOH, —COO—, 2-oxapropane-1,3-dioyl, oxiranyl, oxiranylene, oxetanyl, oxetanylene, 3,4-epoxycyclohexyl, —SH, —NH—, —NH$_2$, —CN and —O—. At least one of $X^4$ represents chlorine or a group having one of —OH, —COOH, —COO—, 2-oxapropane-1,3-dioyl, oxiranyl, oxiranylene, oxetanyl, oxetanylene, 3,4-epoxycyclohexyl, —SH, —NH— and —NH$_2$. In each of formula (a-4) and formula (b-4), it is preferred that only one of $X^4$ is a reactive group. In formula (b-4), Z represents a single bond, —O— or —CH$_2$—, and preferred examples of Z include —O—. The compound having at least two groups capable of reacting with the reactive groups can be reacted with the compound (1-4), so as to obtain the polymer.

BEST MODE FOR CARRYING OUT THE INVENTION

The invention will be described more specifically with reference to examples, but the invention is not limited to the following examples. The test methods in the examples will be described below.

(1) Molecular Weight:
The number average molecular weight (Mn) and the weight average molecular weight (Mw) were measured with GPC.

Apparatus: JASCO GULLIVER 1500 (intelligent differential refractometer RI-1530), produced by JASCO Corp.

Column: Four columns, G4000HXL, G3000HXL, G2500HXL and G2000HXL, produced by Tosoh Corp. connected in this order Column Temperature: 40° C.

Developing Solvent: THF

Flow Rate: 1 mL/min

Standard Substance: polystyrene having known molecular weight (2) Pencil Hardness
Obtained according to JIS K5400, 8.4 Pencil Scratch Test.
In the chemical formulae in the examples, Me represents methyl, and Ph represents phenyl.

EXAMPLE 1

Compound (7) (1.8 g) and Compound (8) (1.1 g) were dissolved in toluene (10 mL). The solution was heated to 70° C., to which a Karstedt catalyst (1 μL) was then added, followed by stirring at the same temperature for 3 hours. The polymer in the reaction liquid obtained was measured for molecular weight with GPC, and thus it was found that Mn=2,400 and Mw=3,900. The reaction liquid was dropped on a glass plate, and toluene was evaporated therefrom to obtain a smooth and transparent film adhered on the surface of the glass. It was heated to 300° C. for 1 hour and measured for film hardness by the pencil hardness test, and it was H. The film thus heated was immersed in toluene at room temperature for 1 hour while the film was adhered to the glass, and then it was visually observed. As a result, no change was found in the film, and thus the resulting polymer film was good in solvent resistance.

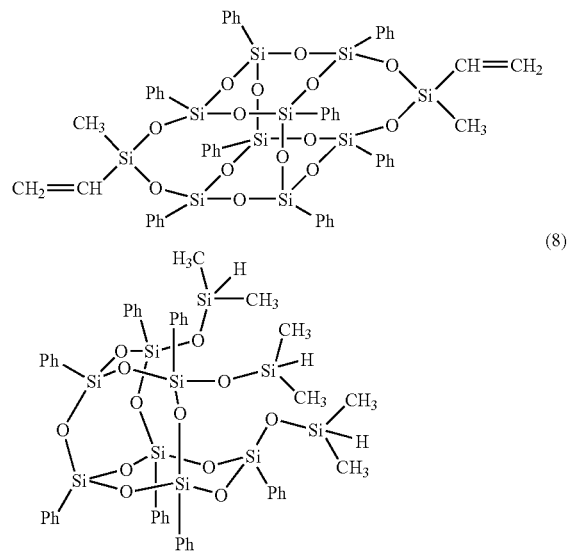

EXAMPLE 2

Compound (7) (3.0 g) used in Example, Compound (8) (1.1 g) used in Example 1 and Compound (9) (0.13 g) were dissolved in toluene (20 mL). The solution was heated to 90° C., to which a Karstedt catalyst (2 μL) was then added, followed by stirring at the same temperature for 3 hours. The polymer in the reaction liquid obtained was measured for molecular weight with GPC, and thus it was found that Mn=5,400 and Mw=17,200. The reaction liquid was dropped on a glass plate, and toluene was evaporated therefrom to obtain a smooth and transparent film adhered on the surface of the glass. It was heated to 250° C. for 1 hour and measured for film hardness by the pencil hardness test, and it was H or more. The film thus heated was immersed in toluene at room temperature for 1 hour while the film was adhered to the glass, and then it was visually observed. As a result, no change was found in the film, and thus the resulting polymer film was good in solvent resistance.

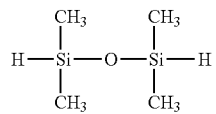

EXAMPLE 3

The aforementioned Compound (7) (3.0 g), the aforementioned Compound (8) (1.4 g) and Compound (10) (0.12 g) were dissolved in toluene (20 mL). The solution was heated to 80° C., to which a Karstedt catalyst (2 μL) was then added, followed by stirring at 90° C. for 1 hour. The reaction liquid obtained was dropped on a glass plate, and toluene was evaporated therefrom to obtain a smooth and transparent film adhered on the surface of the glass. It was heated to 250° C. for 1 hour and measured for film hardness by the pencil hardness test, and it was H or more. The film thus heated was immersed in toluene at room temperature for 1 hour while the film was adhered to the glass, and then it was visually observed. As a result, no change was found in the film, and thus the resulting polymer film was good in solvent resistance.

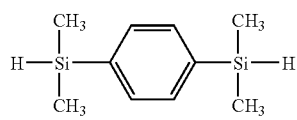
(10)

EXAMPLE 4

The aforementioned Compound (7) (3.0 g) and Compound (11) (0.72 g) were dissolved in toluene (30 mL). The solution was heated to 90° C., to which a Karstedt catalyst (3 μL) was then added, followed by stirring at the same temperature for 3 hours. The polymer in the reaction liquid obtained was measured for molecular weight with GPC, and thus it was found that Mn=6,000 and Mw=16,900. The reaction liquid was dropped on a glass plate, and toluene was evaporated therefrom to obtain a smooth and transparent film adhered on the surface of the glass.

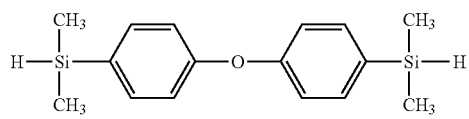
(11)

EXAMPLE 5

The aforementioned Compound (7) (3.0 g) and the aforementioned Compound (10) (0.49 g) were dissolved in toluene (30 mL). The solution was heated to 90° C., to which a Karstedt catalyst (3 μL) was then added, followed by stirring at the same temperature for 3 hours. The polymer in the reaction liquid obtained was measured for molecular weight with GPC, and thus it was found that Mn=9,400 and Mw=32,400. The reaction liquid was dropped on a glass plate, and toluene was evaporated therefrom to form a smooth and transparent film adhered on the surface of the glass.

EXAMPLE 6

The aforementioned Compound (7) (1.8 g), the aforementioned Compound (8) (0.55 g) and Compound (13) (0.5 g) were dissolved in toluene (15 mL). The solution was heated to 90° C., to which a Karstedt catalyst (1 μL) was then added, followed by stirring at the same temperature for 2 hours. The polymer in the reaction liquid obtained was measured for molecular weight with GPC, and thus it was found that Mn=2,700 and Mw=5,100. The reaction liquid was dropped on a glass plate, and toluene was evaporated therefrom to obtain a smooth and transparent film adhered on the surface of the glass.

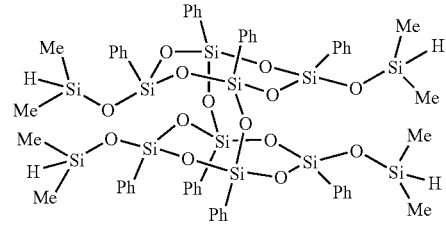
(13)

EXAMPLE 7

The reaction liquid obtained in Example 1 was coated by the spin coating method on a glass substrate having been subjected to chromium plating, and then heated to 80° C. for 3 minutes. It was further heated to 220° C. for 30 minutes to obtain a transparent film with good adhesiveness having a thickness of 3.5 μm. The film was measured for refractive index with an Abbe refractometer, and thus it was 1.567. The film was measured for relative dielectric constant with LCR Meter 4263B, produced by Hewlett-Packard Corp., and thus it was 2.8 (1 KHz).

EXAMPLE 8

The reaction liquid obtained in Example 1 was coated by the spin coating method on a glass substrate having been subjected to chromium plating, and then heated to 80° C. for 3 minutes. It was further heated to 220° C. for 30 minutes to obtain a transparent film with good adhesiveness having a thickness of 1.5 μm. The film had a light transmittance of 90% or more in a wavelength range of from 380 to 720 nm.

EXAMPLE 9

The reaction liquid obtained in Example 1 was coated by the spin coating method on a glass substrate having ITO vapor-deposited on the surface thereof, and then heated to 80° C. for 3 minutes. It was further heated to 200° C. for 30 minutes to obtain a transparent film with good adhesiveness having a thickness of 100 nm. The surface of the film was analyzed by the electron spectroscopy by X-ray irradiation, and thus In (indium) was not detected. The film of the polymer of the invention has a favorable function of preventing elution of metallic ions.

EXAMPLE 10

After evaporating toluene from a reaction liquid obtained in the same manner as in Example 1, the residue was again dissolved in a toluene-mesitylene mixed solvent (volume ratio: 1/1). The resulting solution was coated on an aluminum foil with an applicator, and the aluminum foil was heated in an oven to 150° C. for 1 hour. Thereafter, the aluminum foil was removed with hydrochloric acid to produce a colorless transparent film with good flexibility and strength having a thickness of 45 μm.

EXAMPLE 11

The aforementioned Compound (7) (1.8 g) and the aforementioned Compound (8) (1.1 g) were dissolved in toluene (15 mL). The solution was heated to 90° C., to which a Karstedt catalyst (1 μL) was then added, followed by stirring at the same temperature for 2 hours. The polymer in the reaction liquid obtained was measured for molecular weight with GPC, and thus it was found that Mn=5,400 and Mw=17,200. The reaction liquid was coated on a glass substrate, and toluene was evaporated therefrom at room temperature. The resulting film was stripped from the glass substrate and measured for decomposition temperature with TGA, and it was 362° C.

EXAMPLE 12

The reaction liquid obtained in Example 11 was coated a glass substrate, and toluene was evaporated at room temperature, followed by heating to 150° C. for 1 hour. The resulting film was stripped from the glass substrate and measured for decomposition temperature with TGA, and it was 378° C.

EXAMPLE 13

The reaction liquid obtained in Example 11 was coated a glass substrate, and toluene was evaporated at room temperature, followed by heating to 250° C. for 1 hour. The resulting film was stripped from the glass substrate and measured for decomposition temperature with TGA, and it was 376° C.

INDUSTRIAL APPLICABILITY

According to the invention, such a polymer can be synthesized that has a PSQ skeleton having a T8D2 structure or a structure similar thereto into a main chain and has a distinct structure. Such a polymer can also be produced that has, as a main chain, a structure obtained by continuously connecting PSQ skeletons of cage structures. The polymer can be controlled in thermal motion of the molecular chains since the main chain abundantly contains rigid parts having a large molecular weight. Therefore, it can be favorably applied to such a purpose that the motion of molecular chains is to be controlled, for example, purposes requiring such properties as gas permeability and dimensional stability. A polymer having a large refractive index can be obtained by using a compound having a group with a large refractive index, such as a phenyl group, bonded to the Si atom constituting PSQ, as the compound (1) and the counterpart of the reaction therewith. On the other hand, the extent of the refractive index can be adjusted by using a compound with a low refractive index as the counterpart of the compound (1). Therefore, in the case where the polymer is coated on a surface of a substrate, such as glass and a polymer, the refractive index thereof can be adjusted to a value close to the substrate. The polymer of the invention has, in addition to the aforementioned characteristics, such characteristics that have not been known in the conventional polymers using a silsesquioxane derivative, and is excellent in heat resistance, solvent resistance, adhesion property to a substrate, transparency, film forming property and the like. The polymer can be used as a film, a sheet and a molded article.

The invention claimed is:

1. A polymer obtained by subjecting a silsesquioxane derivative represented by formula (1-0) and a compound having at least two groups capable of reacting with a reactive group in the silsesquioxane derivative to hydrosilylation:

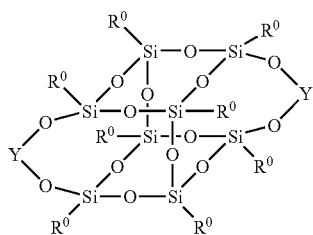

(1-0)

wherein $R^0$ each independently represents alkyl, aryl or arylalkyl; in the alkyl, the number of carbon atoms is from 1 to 40, arbitrary hydrogen may be replaced by fluorine, and arbitrary —$CH_2$— may be replaced by —O— or cycloalkylene; in the aryl, arbitrary hydrogen may be replaced by halogen or alkyl having 1-20 carbon atoms; the arylalkyl is constituted by aryl in which arbitrary hydrogen may be replaced by halogen or alkyl having 1-20 carbon atoms, and alkylene in which arbitrary hydrogen may be replaced by fluorine, and arbitrary —$CH_2$— may be replaced by —O— or cycloalkylene; in the alkyl having 1-20 carbon atoms as a substituent of the aryl, arbitrary hydrogen may be replaced by fluorine, and arbitrary —$CH_2$— may be replaced by —O—, cycloalkylene or phenylene; and Y each represents a group represented by formula (a) or formula (b):

(a)

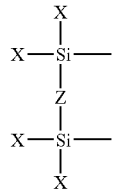

(b)

wherein X each independently represents hydrogen, chlorine, a group defined as the same as $R^0$, or a group having one of —CH=CH— and —C≡C—; in each of formula (a) and formula (b), at least one of X represents hydrogen, or a group having one of —CH=CH— and —C≡C—; and in formula (b), Z represents a single bond, —O— or —$CH_2$—.

2. The polymer according to claim 1, wherein all $R^0$ each represents the same group selected from unsubstituted phenyl, cyclopentyl and cyclohexyl; in each of formula (a) and formula (b), one of X represents hydrogen, or a group having one of —CH=CH— and —C≡C—, and the balance of X each represents a group defined as the same as $R^0$; and in formula (b), Z represents —O—.

3. The polymer according to claim 1, which is obtained by subjecting a silsesquioxane derivative represented by formula (1-1) and a compound having at least two Si—H groups to hydrosilylation:

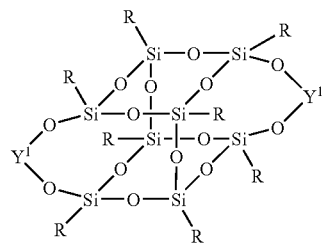

(1-1)

wherein R each independently represents alkyl, aryl or arylalkyl; in the alkyl, the number of carbon atoms is from 1 to 40, arbitrary hydrogen may be replaced by fluorine, and arbitrary —$CH_2$— may be replaced by —O— or cycloalkylene; in the aryl, arbitrary hydrogen may be replaced by halogen or alkyl having 1-20 carbon atoms; the arylalkyl is constituted by aryl in which arbitrary hydrogen may be replaced by halogen or alkyl having 1-20 carbon atoms, and alkylene in which arbitrary hydrogen may be replaced by fluorine, and arbitrary —$CH_2$— may be replaced by —O— or cycloalkylene; in the alkyl having 1-20 carbon atoms as a substituent of the aryl, arbitrary hydrogen may be replaced by fluorine, and arbitrary —$CH_2$— may be replaced by —O—, cycloalkylene or phenylene; and $Y^1$ each represents a group represented by formula (a-1) or formula (b-1):

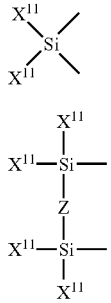

(a-1)

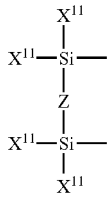

(b-1)

in each of formula (a-1) and formula (b-1), at least one of $X^{11}$ represents alkenyl, and the balance of $X^{11}$ each independently represents chlorine, or a group defined as the same as R; and in the formula (b-1), Z represents a single bond, —O— or —CH$_2$—.

4. The polymer according to claim 3, which is obtained by subjecting a silsesquioxane derivative represented by formula (1-1) and at least one compound, selected from a silsesquioxane derivative represented by formula (1-2), a compound represented by formula (2-1), a compound represented by formula (3-1), a compound represented by formula (4-1), a compound represented by formula (5-1) and a compound represented by formula (6-1), to hydrosilylation:

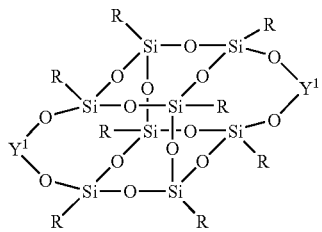

(1-1)

wherein R each independently represents alkyl, aryl or arylalkyl; in the alkyl, the number of carbon atoms is from 1 to 40, arbitrary hydrogen may be replaced by fluorine, and arbitrary —CH$_2$— may be replaced by —O— or cycloalkenylene; in the aryl, arbitrary hydrogen may be replaced by halogen or alkyl having 1-20 carbon atoms; the arylalkyl is constituted by aryl in which arbitrary hydrogen may be replaced by halogen or alkyl having 1-20 carbon atoms, and alkylene in which arbitrary hydrogen may be replaced by fluorine, and arbitrary —CH$_2$— may be replaced by —O—, or cycloalkylene; in the alkyl having 1-20 carbon atoms as a substituent of the aryl, arbitrary hydrogen may be replaced by fluorine, and arbitrary —CH$_2$— may be replaced by —O—, cycloalkylene or phenylene; and $Y^1$ each represents a group represented by formula (a-1) or formula (b-1):

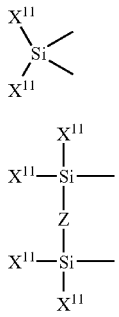

(a-1)

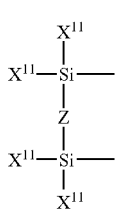

(b-1)

in each of formula (a-1) and formula (b-1), at least one of $X^{11}$ represents alkenyl, and the balance of $X^{11}$ each independently represents chlorine, or a group defined as the same as R; and in formula (b-1), Z represents a single bond, —O— or —CH$_2$—:

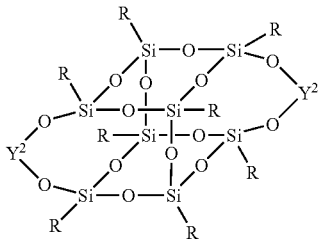

(1-2)

wherein R each represents a group defined as the same as R in formula (1-1); and $Y^2$ each represents a group represented by formula (a-2) or formula (b-2):

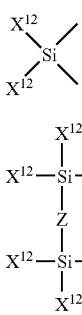

(a-2)

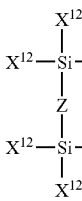

(b-2)

in each of formula (a-2) and formula (b-2), at least one of $X^{12}$ represents hydrogen, and the balance of $X^{12}$ each independently represents chlorine, or a group defined as the same as R; and in formula (b-2), Z represents a single bond, —O— or —CH$_2$—:

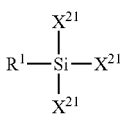

(2-1)

wherein $R^1$ represents a group defined as the same as R in formula (1-1); and at least two of $X^{21}$ each represents hydrogen, and the balance of $X^{21}$ each independently represents $R^1$:

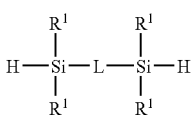

(3-1)

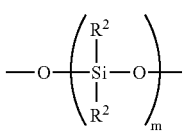

(c)

wherein $R^1$ each represents a group defined as the same as R in formula (1-1); L represents a single bond, —O—, —CH$_2$—, —(CH$_2$)$_2$—, —(CH$_2$)$_3$—, —(CH$_2$)$_4$—, 1,4-phenylene, 4,4'-diphenylene, 4,4'-oxy-1,1'-diphenylene or a group represented by formula (c); $R^2$ each represents a group defined as the same as $R^1$; and m represents an integer of from 1 to 30:

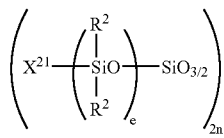

wherein $R^2$ each represents a group defined as the same as $R^1$ in formula (2-1); at least two of $X^{21}$ each represents hydrogen, and the balance of $X^{21}$ each represents a group defined as the same as R in formula (1-1); e represents 0 or 1; and n represents an integer of from 3 to 30:

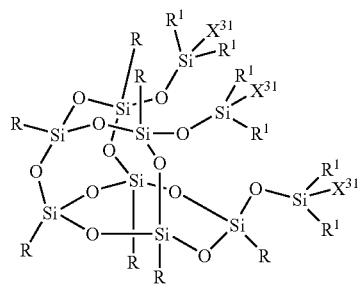

wherein R and $R^1$ each represents a group defined as the same as R in formula (1-1); and at least two of $X^{31}$ each represents hydrogen, and the balance of $X^{31}$ each represents $R^1$:

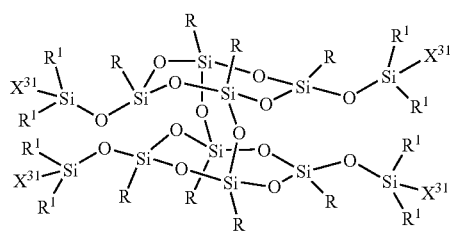

wherein R and $R^1$ each represents a group defined as the same as R in formula (1-1); and at least two of $X^{31}$ each represents hydrogen, and the balance of $X^{31}$ each represents a group defined as the same as $R^1$.

5. The polymer according to claim 4, which is obtained by subjecting a silsesquioxane derivative represented by formula (1-1) and a silsesguioxane derivative represented by formula (1-2) to hydrosilylation.

6. The polymer according to claim 4, wherein in formula (1-1), all R each represents the same group selected from unsubstituted phenyl, cyclopentyl and cyclohexyl; in each of formula (a-1) and formula (b-1), one of $X^{11}$ represents alkenyl, and the balance of $X^{11}$ each represents alkyl having 1-8 carbon atoms, fluorinated alkyl having 1-8 carbon atoms, unsubstituted phenyl, cyclopentyl or cyclohexyl; in each of formula (a-2) and formula (b-2), one of $X^{12}$ represents hydrogen, and the balance of $X^{12}$ each represents alkyl having 1-8 carbon atoms, fluorinated alkyl having 1-8 carbon atoms, unsubstituted phenyl, cyclopentyl or cyclohexyl; in formula (b-1) and formula (b-2), Z represents —O—; in each of formula (2-1), formula (3-1), formula (5-1) and formula (6-1), $R^1$ each represents alkyl having a 1-8 carbon atoms, fluorinated alkyl having 1-8 carbon atoms, unsubstituted phenyl, cyclopentyl or cyclohexyl; in formula (2-1), two of $X^{21}$ each represents hydrogen, and the balance of $X^{21}$ each represents $R^1$; and in formula (4-1), two of $X^{21}$ each represents hydrogen, and the balance of $X^{21}$ each represents a group defined as the same as R in formula (1-1).

7. The polymer according to claim 4, wherein in formula (1-1), all R each represents the same group selected from unsubstituted phenyl, cyclopentyl and cyclohexyl; in each of formula (a-1) and formula (b-1), one of $X^{11}$ represents vinyl, allyl or styryl, and the balance of $X^{11}$ each represents alkyl having 1-8 carbon atoms, fluorinated alkyl having 1-8 carbon atoms, unsubstituted phenyl, cyclopentyl or cyclohexyl; in each of formula (a-2) and formula (b-2), one of $X^{12}$ represents hydrogen, and the balance of $X^{12}$ each represents alkyl having 1-8 carbon atoms, fluorinated alkyl having 1-8 carbon atoms, unsubstituted phenyl, cyclopentyl or cyclohexyl; in formula (b-1) and formula (b-2), Z represents —O—; in each of formula (2-1), formula (3-1), formula (5-1) and formula (6-1), $R^1$ each represents alkyl having 1-8 carbon atoms, fluorinated alkyl having 1-8 carbon atoms, unsubstituted phenyl, cyclopentyl or cyclohexyl; in formula (2-1), two of $X^{21}$ each represents hydrogen, and the balance of $X^{21}$ each represents $R^1$; and in formula (4-1), two of $X^{21}$ each represents hydrogen, and the balance of $X^{21}$ each represents a group defined as the same as R in formula (1-1).

8. The polymer according to claim 4, wherein in formula (1-1), all R each represents unsubstituted phenyl; in each of formula (a-1) and formula (b-1), one of $X^{11}$ represents vinyl, allyl or styryl, and the balance of $X^{11}$ each represents alkyl having 1-4 carbon atoms or unsubstituted phenyl; in each of formula (a-2) and formula (b-2), one of $X^{12}$ represents hydrogen, and the balance of $X^{12}$ each represents alkyl having 1-4 carbon atoms or unsubstituted phenyl; in formula (b-1) and formula (b-2), Z represents —O—; in each of formula (2-1), formula (3-1), formula (5-1) and formula (6-1), $R^1$ each represents alkyl having 1-4 carbon atoms or unsubstituted phenyl; in formula (2-1), two of $X^{21}$ each represents hydrogen, and the balance of $X^{21}$ each represents $R^1$; and in formula (4-1), two of $X^{21}$ each represents hydrogen, and the balance of $X^{21}$ each represents unsubstituted phenyl.

9. The polymer according to claim 1, which is obtained by subjecting a silsesquioxane derivative represented by (1-2) and a compound having at least two alkenyls or a compound having a carbon-carbon triple bond to hydrosilylation:

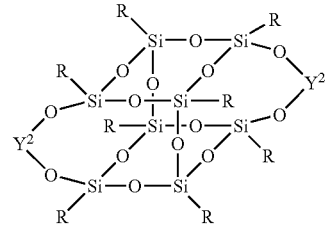

wherein R each independently represents alkyl, aryl or arylalkyl; in the alkyl, the number of carbon atoms is from 1 to 40, arbitrary hydrogen may be replaced by fluorine, and arbitrary —CH$_2$— may be replaced by —O— or cycloalkenylene; in the aryl, arbitrary hydrogen may be replaced by halogen or alkyl having 1-20 carbon atoms; the arylalkyl is constituted by aryl in which arbitrary hydrogen may be replaced by halogen or alkyl having 1-20 carbon atoms, and alkylene in which arbitrary hydrogen may be replaced by fluorine, and arbitrary —CH$_2$— may be replaced by —O— or cycloalkylene; in the alkyl having 1-20 carbon atoms as a substituent of the aryl, arbitrary hydrogen may be replaced by fluorine, and arbitrary —CH$_2$— may be replaced by —O— cycloalkylene or phenylene; and $Y^2$ each represents a group represented by formula (a-2) or formula (b-2):

(a-2)

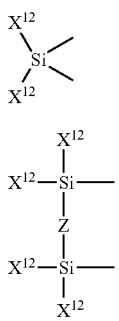

(b-2)

in each of formula (a-2) and formula (b-2), at least one of $X^{12}$ represents hydrogen, and the balance of $X^{12}$ each independently represents chlorine, or a group defined as the same as R; and in formula (b-2), Z represents a single bond, —O— or —CH$_2$—.

10. The polymer according to claim 9, which is obtained by subjecting a silsesquioxane derivative represented by formula (1-2) and at least one compound of, a compound represented by formula (2-2), a compound represented by formula (3-2), a compound represented by formula (4-2), a compound represented by formula (5-2), a compound represented by formula (6-2), a compound represented by formula (d-1), a compound represented by formula (d-2), a compound represented by formula (d-3) and a compound represented by formula (d-4), to hydrosilylation:

(1-2)

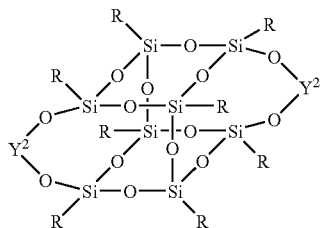

wherein R each independently represents alkyl, aryl or arylalkyl; in the alkyl, the number of carbon atoms is from 1 to 40, arbitrary hydrogen may be replaced by fluorine, and arbitrary —CH$_2$— may be replaced by —O— or cycloalkenylene; in the aryl, arbitrary hydrogen may be replaced by halogen or alkyl having 1-20 carbon atoms; the arylalkyl is constituted by aryl in which arbitrary hydrogen may be replaced by halogen or alkyl having 1-20 carbon atoms, and alkylene in which arbitrary hydrogen may be replaced by fluorine, and arbitrary —CH$_2$— may be replaced by —O— or cycloalkylene; in the alkyl having 1-20 carbon atoms as a substituent of the aryl, arbitrary hydrogen may be replaced by fluorine and arbitrary —CH$_2$— may be replaced by —O— cycloalkylene or phenylene; and $Y^2$ each represents a group represented by formula (a-2) or formula (b-2):

(a-2)

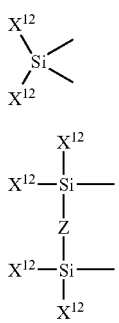

(b-2)

in each of formula (a-2) and formula (b-2), at least one of $X^{12}$ represents hydrogen, and the balance of $X^{12}$ each independently represents chlorine, or a group defined as the same as R; and in formula (b-2), Z represents a single bond, —O— or —CH$_2$—:

(2-2)

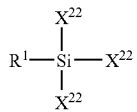

wherein $R^1$ represents a group defined as the same as R in formula (1-2); and at least two of $X^{22}$ each represents alkenyl or a group having a carbon-carbon triple bond, and the balance of $X^{22}$ each independently represents $R^1$:

(3-2)

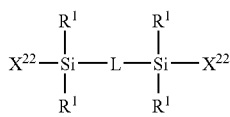

(c)

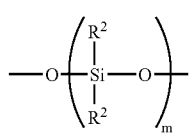

wherein $R^1$ each represents a group defined as the same as R in formula (1-2); $X^{22}$ each represents alkenyl; L represents a single bond, —O—, —CH$_2$—, —(CH$_2$)$_2$—, —(CH$_2$)$_3$—, —(CH$_2$)$_4$—, 1,4-phenylene, 4,4'-diphenylene, 4,4'-oxy-1,1'-diphenylene or a group represented by formula (c); $R^2$ each represents a group defined as the same as $R^1$; and m represents an integer of from 1 to 30:

(4-2)

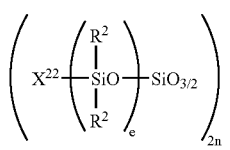

wherein $R^2$ each represents a group defined as the same as $R^1$ in formula (2-2); at least two of $X^{22}$ each represents alkenyl, and the balance of $X^{22}$ each represents a group defined as the same as R in formula (1-2); e represents 0 or 1; and n represents an integer of from 3 to 30:

(5-2)

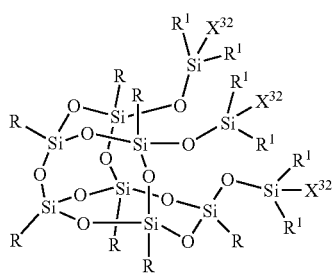

wherein R and R$^1$ each represents a group defined as the same as R in formula (1-2); and at least two of X$^{32}$ each represents alkenyl, and the balance of X$^{32}$ each represents R$^1$:

(6-2)

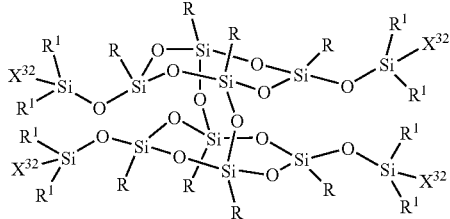

wherein R and R$^1$ each represents a group defined as the same as R in formula (1-2); and at least two of X$^{32}$ each represents alkenyl, and the balance of X$^{32}$ each represents R$^1$:

$$H_2C=CH-R^3-CH=CH_2 \quad (d\text{-}1)$$

$$HC\equiv C-R^3-C\equiv CH \quad (d\text{-}2)$$

$$R^4-C\equiv C-R^4 \quad (d\text{-}3)$$

$$R^4-C\equiv C-C\equiv C-R^4 \quad (d\text{-}4)$$

wherein each of formula (d-1) to formula (d-4), R$^3$ each represents alkylene having 1-40 carbon atoms, or phenylene in which arbitrary hydrogen may be replaced by halogen or alkyl having 1-4 carbon atoms; R$^4$ each represents alkyl having 1-8 carbon atoms or phenyl, in which arbitrary hydrogen may be replaced by halogen or alkyl having 1-4 carbon atoms; in each of the alkylene having 1-40 carbon atoms and the alkyl having 1-8 carbon atoms, arbitrary —CH$_2$— may be replaced by —O— or —COO—.

11. The polymer according to claim 10, wherein in formula (1-2), all R each represents the same group selected from unsubstituted phenyl, cyclopentyl and cyclohexyl; in each of formula (a-2) and formula (b-2), one of X$^{12}$ represents hydrogen, and the balance of X$^{12}$ each represents alkyl having 1-8 carbon atoms, fluorinated alkyl having 1-8 carbon atoms, unsubstituted phenyl, cyclopentyl or cyclohexyl; in formula (b-2), Z represents —O—; in each of formula (2-2), formula (3-2), formula (5-2) and formula (6-2), R$^1$ each represents alkyl having 1-8 carbon atoms, fluorinated alkyl having 1-8 carbon atoms, unsubstituted phenyl, cyclopentyl or cyclohexyl.

12. The polymer according to claim 10, wherein in formula (1-2), all R each represents the same group selected from unsubstituted phenyl, cyclopentyl and cyclohexyl; in each of formula (a-2) and formula (b-2), one of X$^{12}$ represents hydrogen, and the balance of X$^{12}$ each represents alkyl having 1-8 carbon atoms, fluorinated alkyl having 1-8 carbon atoms, unsubstituted phenyl, cyclopentyl or cyclohexyl; in formula (b-2), Z represents —O—; in each of formula (2-2), formula (3-2), formula (5-2) and formula (6-2), R$^1$ each represents alkyl having 1-8 carbon atoms, fluorinated alkyl having 1-8 carbon atoms, unsubstituted phenyl, cyclopentyl or cyclohexyl; in formula (2-2), two of X$^{22}$ each represents vinyl, allyl or styryl, and the balance of X$^{22}$ each represents R$^1$; in formula (3-2), X$^{22}$ represents vinyl, allyl or styryl; in formula (4-2), two of X$^{22}$ each represents vinyl, allyl or styryl, and the balance of X$^{22}$ each represents a group defined as the same as R in formula (1-2); and in each of formula (5-2) and formula (6-2), at least two of X$^{32}$ each represents vinyl, allyl or styryl, and the balance of X$^{32}$ each represents R$^1$.

13. The polymer according to claim 10, wherein in formula (1-2), all R each represents unsubstituted phenyl; in each of formula (a-2) and formula (b-2), one of X$^{12}$ represents hydrogen, and the balance of X$^{12}$ each represents alkyl having 1-4 carbon atoms or unsubstituted phenyl; in formula (b-2), Z represents —O—; in each of formula (2-2), formula (3-2), formula (5-2) and formula (6-2), R$^1$ each represents alkyl having 1-4 carbon atoms or unsubstituted phenyl; in formula (2-2), two of X$^{22}$ each represents vinyl, allyl or styryl, and the balance of X$^{22}$ each represents R$^1$; in formula (3-2), X$^{22}$ represents vinyl, allyl or styryl; in formula (4-2), two of X$^{22}$ each represents vinyl, allyl or styryl, and the balance of X$^{22}$ each represents unsubstituted phenyl; and in each of formula (5-2) and formula (6-2), at least two of X$^{32}$ each represents vinyl, allyl or styryl, and the balance of X$^{32}$ each represents R$^1$.

14. A process for producing the polymer as described in claim 4, which comprises reacting a silsesquioxane derivative represented by formula (1-1) with at least one of a silsesquioxane derivative represented by formula (1-2), a compound represented by formula (2-1), a compound represented by formula (3-1), a compound represented by formula (4-1), a compound represented by formula (5-1) and a compound represented by formula (6-1) in the presence of a hydrosilylation catalyst:

(1-1)

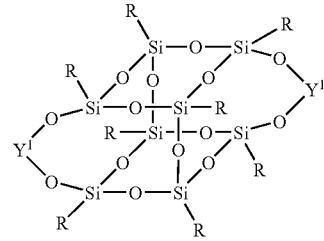

wherein R each independently represents alkyl, aryl or arylalkyl; in the alkyl, the number of carbon atoms is from 1 to 40, arbitrary hydrogen may be replaced by fluorine, and arbitrary —CH$_2$— may be replaced by —O— or cycloalkylene; in the aryl, arbitrary hydrogen may be replaced by halogen or alkyl having 1-20 carbon atoms; the arylalkyl is constituted by aryl in which arbitrary hydrogen may be replaced by halogen or alkyl having 1-20 carbon atoms, and alkylene in which arbitrary hydrogen may be replaced by fluorine, and arbitrary —CH$_2$— may be replaced by —O— or cycloalkylene; in the alkyl having 1-20 carbon atoms as a substituent of the aryl, arbitrary hydrogen may be replaced by fluorine, and arbitrary —CH$_2$— may be replaced by —O— cycloalkylene or phenylene; and Y$^1$ each represents a group represented by formula (a-1) or formula (b-1):

(a-1)

(b-1)

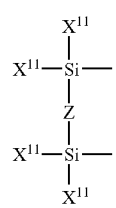

in each of formula (a-1) and formula (b-1), at least one of X$^{11}$ represents alkenyl, and the balance of X$^{11}$ each independently represents chlorine, or a group defined as the same as R; and in formula (b-1), Z represents a single bond, —O— or —CH$_2$—:

(2-1)

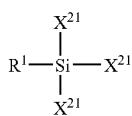

wherein $R^1$ represents a group defined as the same as R in formula (1-1); and at least two of $X^{21}$ each represents hydrogen, and the balance of $X^{21}$ each independently represents $R^1$:

(3-1)

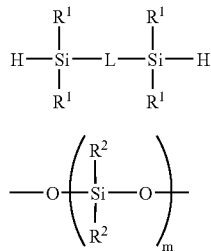

(c)

wherein $R^1$ each represents a group defined as the same as R in formula (1-1); L represents a single bond, —O—, —CH$_2$—, —(CH$_2$)$_2$—, —(CH$_2$)$_3$—, —(CH$_2$)$_4$—, 1,4'-phenylene, 4,4'-diphenylene, 4,4'-oxy-1,1'-diphenylene or a group represented by formula (c); $R^2$ each represents a group defined as the same as $R^1$; and m represents an integer of from 1 to 30:

(4-1)

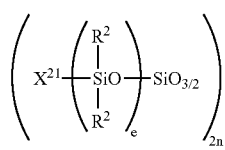

wherein $R^2$ each represents a group defined as the same as $R^1$ in formula (2-1); at least two of $X^{21}$ each represents hydrogen, and the balance of $X^{21}$ each represents a group defined as the same as R in formula (1-1); e represents 0 or 1; and n represents an integer of from 3 to 30:

(5-1)

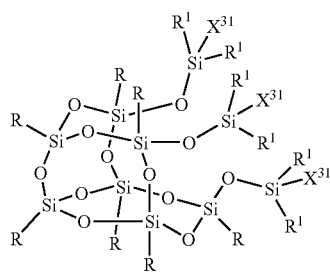

wherein R and $R^1$ each represents a group defined as the same as R in formula (1-1); and at least two of $X^{31}$ each represents hydrogen, and the balance of $X^{31}$ each represents $R^1$:

(6-1)

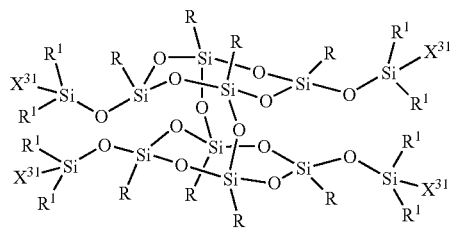

wherein R and $R^1$ each represents a group defined as the same as R in formula (1-1); and at least two of $X^{31}$ each represents hydrogen, and the balance of $X^{31}$ each represents a group defined as the same as $R^1$.

15. A process for producing the polymer as described in claim 10, which comprises reacting a silsesquioxane derivative represented by formula (1-2) with at least one of a compound represented by formula (2-2), a compound represented by formula (3-2), a compound represented by formula (4-2), a compound represented by formula (5-2), a compound represented by formula (6-2), a compound represented by formula (d-1), a (a-2)

(b-2)

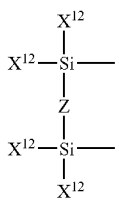

wherein R each represents a group defined as the same as R in formula (1-1); and $Y^2$ each represents a group represented by formula (a-2) or formula (b-2):

(2-2)

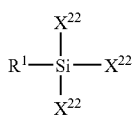

in each of formula (a-2) and formula (b-2), at least one of $X^2$ represents hydrogen, and the balance of $X^{12}$ each independently represents chlorine, or a group defined as the same as R; and in formula (b-2), Z represents a single bond, —O— or —CH$_2$—:

compound represented by formula (d-2), a compound represented by formula (d-3) and a compound represented by formula (d-4) in the presence of a hydrosilylation catalyst:

(1-2)

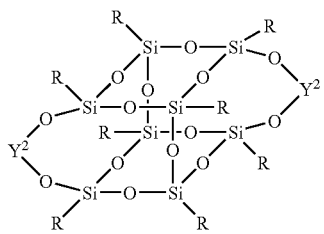

wherein R each independently represents alkyl, aryl or arylalkyl; in the alkyl, the number of carbon atoms is from 1 to 40, arbitrary hydrogen may be replaced by fluorine, and arbitrary —CH$_2$— may be replaced by —O— or cycloalkylene; in the aryl, arbitrary hydrogen may be replaced by halogen or alkyl having 1-20 carbon atoms; the arylalkyl is constituted by aryl in which arbitrary hydrogen may be replaced by halogen or alkyl having 1-20 carbon atoms, and alkylene in which arbitrary hydrogen may be replaced by fluorine, and arbitrary —CH$_2$— may be replaced by —O— or cycloalkylene; in the alkyl having 1-20 carbon atoms as a substituent of the aryl, arbitrary hydrogen may be replaced by fluorine, and arbitrary —CH$_2$— may be replaced by —O— cycloalkylene or phenylene; and Y² each represents a group represented by formula (a-2) or formula (b-2):

(a-2)
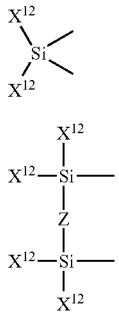

(b-2)

in each of formula (a-2) and formula (b-2), at least one of $X^{12}$ represents hydrogen, and the balance of $X^{12}$ each independently represents chlorine, or a group defined as the same as R; and in formula (b-2), Z represents a single bond, —O— or —CH₂—:

(2-2)
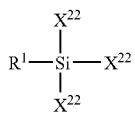

wherein $R^1$ represents a group defined as the same as R in formula (1-2); and at least two of $X^{22}$ each represents alkenyl or a group having a carbon-carbon triple bond, and the balance of $X^{22}$ each independently represents $R^1$:

(3-2)
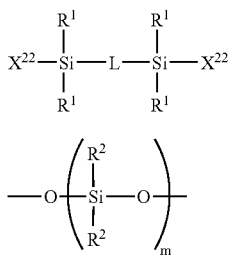

(c)

wherein $R^1$ each represents a group defined as the same as R in formula (1-2); $X^{22}$ each represents alkenyl; L represents a single bond, —O—, —CH₂—, —(CH₂)₂—, —(CH₂)₃—, —(CH₂)₄—, 1,4-phenylene, 4,4'-diphenylene, 4,4'-oxy-1,1'-diphenylene or a group represented by formula (c); $R^2$ each represents a group defined as the same as $R^1$; and m represents an integer of from 1 to 30:

(4-2)
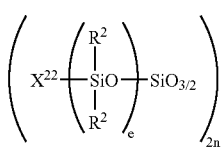

wherein $R^2$ each represents a group defined as the same as $R^1$ in formula (2-2); at least two of $X^{22}$ each represents alkenyl, and the balance of $X^{22}$ each represents a group defined as the same as R in formula (1-2); e represents 0 or 1; and n represents an integer of from 3 to 30:

(5-2)
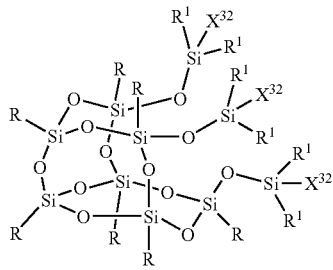

wherein R and $R^1$ each represents a group defined as the same as R in formula (1-2); and at least two of $X^{32}$ each represents alkenyl, and the balance of $X^{32}$ each represents $R^1$:

(6-2)
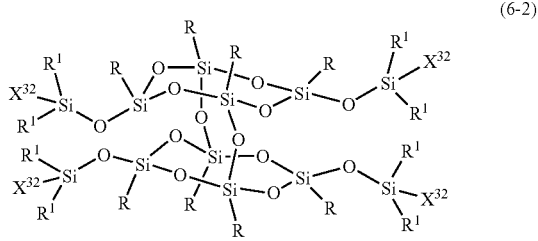

wherein R and $R^1$ each represents a group defined as the same as R in formula (1-2); and at least two of $X^{32}$ each represents alkenyl, and the balance of $X^{32}$ each represents $R^1$;

(d-1)
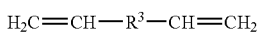

(d-2)
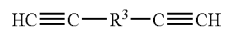

(d-3)
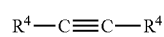

(d-4)
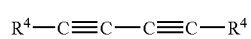

wherein each of formula (d-1) to formula (d-4), $R^3$ each represents alkylene having 1-40 carbon atoms or phenylene in which arbitrary hydrogen may be replaced by halogen or alkyl having 1-4 carbon atoms; $R^4$ each represents alkyl having 1-8 carbon atoms or phenyl in which arbitrary hydrogen may be replaced by halogen or alkyl having 1-4 carbon atoms; in each of the alkylene having 1-40 carbon atoms and the alkyl having 1-8 carbon atoms, arbitrary —CH₂— may be replaced by —O— or —COO—.

16. A coating film obtained by coating the polymer as described in claim 4 onto a substrate.

17. A coating film obtained by coating the polymer as described in claim 10 onto a substrate.

18. A film for preventing elution of metallic ions obtained by coating the polymer as described in claim 4 onto a substrate.

19. A film for preventing elution of metallic ions obtained by coating the polymer as described in claim 10 onto a substrate.

* * * * *